(12) United States Patent
Schroeder et al.

(10) Patent No.: US 6,535,795 B1
(45) Date of Patent: Mar. 18, 2003

(54) METHOD FOR CHEMICAL ADDITION UTILIZING ADAPTIVE OPTIMIZATION

(75) Inventors: Myron E. Schroeder, Tomball, TX (US); Marilyn W. Blaschke, Richmond, TX (US); Michael J. Zetlmeisl, Stafford, TX (US); David M. Fischer, Richmond, TX (US); Kenneth J. Tacchi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/370,311

(22) Filed: Aug. 9, 1999

(51) Int. Cl.[7] .............................................. G05B 21/00
(52) U.S. Cl. .................. 700/266; 700/265; 210/739; 210/709; 210/85; 210/96.1; 210/143; 210/704; 210/705; 210/723; 210/726; 210/727; 210/728; 210/749; 706/15; 706/23; 706/273
(58) Field of Search .............................. 700/266, 265, 700/273; 210/739, 709, 85, 96.1, 143, 704, 705, 723, 726–728, 749; 706/15, 23, 273

(56) References Cited

U.S. PATENT DOCUMENTS

| | | | | |
|---|---|---|---|---|
| 5,376,280 A | * | 12/1994 | Wilhelm et al. | ............. 210/143 |
| 5,733,456 A | * | 3/1998 | Okey et al. | ............... 210/195.1 |
| 5,792,342 A | * | 8/1998 | Heller et al. | .................... 137/3 |
| 6,055,524 A | * | 4/2000 | Cheng | .......................... 706/14 |
| 6,336,058 B1 | * | 1/2002 | Fowee | ......................... 210/696 |

* cited by examiner

*Primary Examiner*—Jill Warden
*Assistant Examiner*—Jennine Brown
(74) *Attorney, Agent, or Firm*—Madan, Mossman & Sriram P.C.

(57) ABSTRACT

The present invention provides a method for chemical addition utilizing adaptive process control optimizations having a combination of expert system(s), neural network(s) and genetic algorithm(s).

20 Claims, 27 Drawing Sheets

ADAPTATION PROCESS CONTROL OPTIMIZATION SYSTEM

METHOD FOR CHEMICAL ADDITION UTILIZING ADAPTIVE OPTIMIZATION

BACKGROUND OF THE INVENTION

1. Field of the Invention

This invention relates generally to a method for chemical addition utilizing adaptive process control optimization. More particularly the invention relates to a method for chemical addition utilizing process control optimization having a combination of expert system(s), neural network(s) and genetic algorithm(s).

2. Background of the Invention

Process control systems are used in a variety of applications to sense process conditions and adjust process operating parameters in an attempt to optimize performance for given sets of goals. Many current conventional process control systems use static representations of the process to be controlled and do not provide for changes in the process control model being used in real time.

In conventional adaptive control theory, a suitable controller structure is chosen and the parameters of the controller are adjusted using static rules so that the output of the process follows the output of the reference of the model asymptotically. Static rules do not permit a process control system to automatically and optimally adapt to changing process conditions.

One significant deficiency of prior art process control systems, whether or not adaptive, is their lack of an intuitive user interface, either for initially configuring a system or for interacting with the system in real-time.

Another significant deficiency of prior art process control systems, whether or not adaptive, is the inability of the process control system to automatically perform control actions and, in so doing, provide a global goal-seeking mechanism that ties the process control system together into a powerful unified system to achieve virtually global level optimization congruent with management objectives and goals. This deficiency results from prior art having limited levels of control point, component, and/or system modeling or control hierarchies. Accordingly, many prior art process control systems, whether or not adaptive, cannot provide concurrent multi-level optimization ranging from specific, component-oriented, narrowly focused levels to the broadest, global level.

Traditional process control systems are built up of discrete components (e.g., physical or real-world devices including instrumentation, meters, sensors, controllers, analyzers, actuators, switches, relays, etc.) that work independently and lack low-level optimization. Some process control systems optimize on a system level without regard to optimization at each component level, while still other systems optimize only at the component level. As no global goal-seeking mechanism ties the parts together into a powerful unified system to achieve management objectives and goals, the overall process fails to achieve virtually global level optimization and integration of low-level or component level optimization with the higher level or system level optimization.

SUMMARY OF THE INVENTION

The present invention provides a method of chemical addition using process control automation. The present method for adaptively controlling the rate of addition of a chemical to a process comprising: conducting a process which is controlled by a distributed control system; utilizing an adaptive process control optimization system in a host relationship to the distributed control system wherein the process control optimization system provides (i) a plurality of goal seeking intelligent software objects (hereinafter "ISOs") further comprising sensor software objects providing current data, historical data, and statistical data; (ii) expert system software objects providing at least one associated rules knowledge base; (iii) adaptive models software objects providing at least one modeling methodology; (iv) predictor software objects providing at least one predictor selection criteria; (v) optimizer software objects providing at least one goal and at least one process constraint; (vi) communications translator software objects providing one or more data communications protocols for a given sampling delta, comprising the concurrent steps of: determining, within the optimizer software objects, output data values which achieve the goals without violating the process constraints; examining, within the expert system software objects, the predictive models that achieve the goals without violating the process constraints; determining, within the expert system software objects, at least one adaptive intervention; providing the at least one adaptive intervention as an input to a distributed control system; and utilizing the at least one adaptive intervention input to the distributed control system for controlling the process.

As more fully described herein below, the present invention provides a method of chemical addition utilizing process control optimization system that achieves, in substantial measure, these above stated objectives by including intelligent software objects (hereinafter referred to as an ISO or ISO's); an adaptive process control optimization system comprising ISO's; a method of initializing the adaptive process control optimization system; and a method of human interaction with the adaptive process control optimization system

BRIEF DESCRIPTION OF THE DRAWINGS

Referring now to the drawings wherein like elements are numbered alike in the several FIGURES.

DETAILED DESCRIPTION OF THE INVENTION

Figure 1:
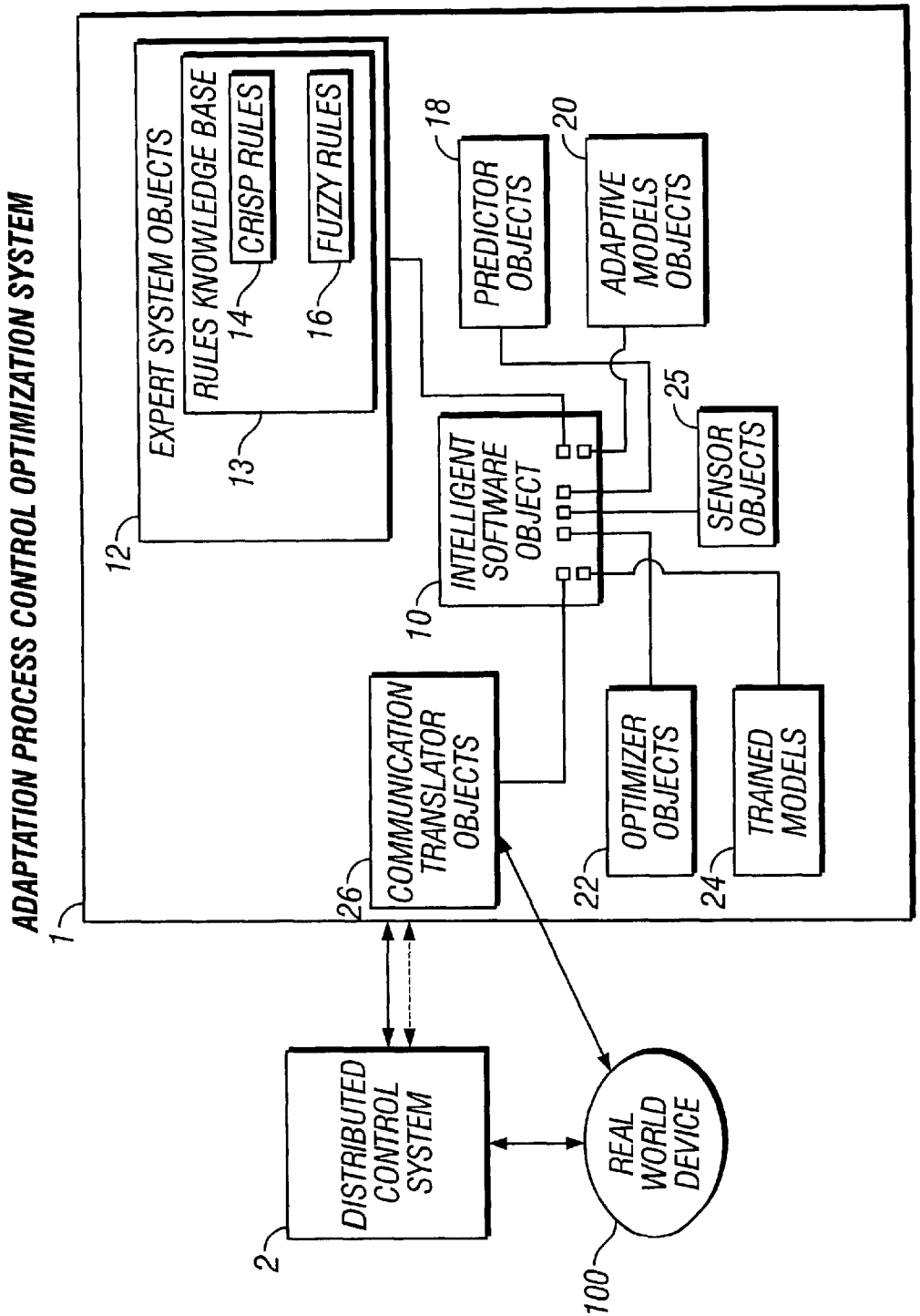
FIG. 1 is a block diagram of the internal software objects included in an ISO in accordance with the present invention.

Referring generally to FIG. 1, the instant invention's method of controlling the addition of a chemical to a process is illustrated. Real-world devices 100, may include real-world instrumentation 30 (e.g., analog meters such as flow, temperature, pressure, pH and level meters and discrete sensors such as flow, temperature, pressure, pH and level switches), real-world control devices 32 (e.g., analog controllers such as flow, temperature, pressure, level controllers and discrete controllers such as programmable logic controllers, and relays, switches, and timers) and real-world actuators 35 (e.g., analog and discrete control valves, governors, variable speed drivers and the like). Real-world devices 100 may provide inputs to the distributed control system 2 or to an intelligent software objects 10 (hereinafter "ISOs"). Outputs from the distributed control system 2 or ISOs 10 may be received as inputs to real-world devices 100, also as shown in FIG. 1. Thus, the real-world devices 100 physically sense and manipulate or control the real-world processes controlled by the adaptive process control optimization system 1 preferably indirectly, through the DCS 2, or optionally through ISOs 10. These real-world devices 100 may include real-world instrumentation 30 (e.g., on on-line sensors or analyzers) may be used to provide key performance indicator measurements to at least one communications translator software object. Alternatively, key performance indicators may be calculated from other on-line sensors or lab data or a combination thereof.

As known by those skilled in the art, distributed process control system 2 (hereinafter "DCS") preferably uses a plurality of microprocessors to process inputs from real-world devices 100 according to configurable controllers provided internally by the DCS 2 and provide outputs to real-world devices 100 to physically manipulate the real-world process. Preferably, the DCS 2 is an analog-based control system with optional discrete control capability. Optionally, the DCS 2 also provides an interface to a real-world device 100 generally known as a microprocessor based discrete logic controller system (herein after "PLC"). The DCS 2 preferably has remote communication capability with an adaptive process control optimization system 1 resident in a host computer. Optionally, the DCS 2 may provide internal communication capability and an internal computer usable media capable of adaptively representing and influencing processes.

The adaptive process control optimization system 1, in the instant invention is in a host position, or a hierarchically higher position, to the DCS 2. The inventive adaptive process control optimization system 1 uses computer-based models of the process to be controlled to aid in controlling that process even in the presence of parametric or structural uncertainty in the models used to represent the process. Adaptive process control system of the instant invention changes its models to adapt to current process conditions and optimize a process' performance given a set of goals and objectives.

Again referring generally to FIG. 1, the instant invention's adaptive process control optimization system 1 is comprised of intelligent software objects, or ISOs 10, which provide a variety of functions useful in control and/or optimization applications and which can be connected or grouped together in a variety of ways. ISOs 10 comprise internal software objects; in a preferred embodiment, the present invention uses a software programming methodology known as object-oriented programming, typically implemented using a computer language such as Small-Talk™ or C++, to implement the ISO's 10 internal software objects, thus creating an adaptive, object-oriented process control optimization system 1. It is understood and within the contemplation of the applicants that the software objects, both internal software objects and other software objects, can, but need not, be limited to "object-oriented" software objects. The instant invention's adaptive process control optimization system 1 performs its control functions by having one or more ISOs 10 configured to cooperatively represent the process to be controlled; optimization is also achieved through the cooperation between an ISO's 10 internal software objects as well as between ISOs 10 configured and acting as a system.

The instant invention's ISOs 10 are capable of configurably maintaining a record of events associated with the process, concrete components, and/or abstract components represented by those ISOs 10. Each ISO 10 is configured with sensor objects 25, described more fully herein below, acting as data managers of the state(s) of the controlled process, including the state(s) of the control variables for the process, represented as discrete variables or continuous variables.

Examples of continuous variables that could be used as control variables in a process include, measured, calculated, and user input continuous variables, for example, flow, temperature, pressure, heat duty, composition, color, density, humidity, weight, flooding, level, percent solids, pH, ratios, unit efficiencies, cost, cost per unit, pressure drop, valve positions, rpm, gum concentration, oxygen stability, corrosion rates, octane number, and lab data. Examples of discrete variables that could include measured, calculated and user input discrete variables, for example, on/off or open/closed status of equipment such as pumps, compressors, switches, expanders, relays, mixers, valves, lines, surge, processing regime, and product recipe selection.

Using these sensor objects 25, ISO's 10 expert system objects 12, predictor objects 18, adaptive models objects 20, and optimizer objects 22 work together to find, calculate, interpret, and derive new states for the control variables that result in the desired process state(s) or achieve the process goal(s) which may include specific process goals, (e.g., product purity, product stability, energy consumption, etc.).

In addition to real-world processes, concrete components, and/or abstract components, the instant invention's adaptive process control optimization system 1 is designed to monitor its own performance and adaptively modify its own initial configuration to improve performance according to its initial optimizing objectives and goals, its current optimizing objectives and goals, and objectives and goals specified by system users.

Referring to FIG. 1, a block diagram of an exemplary ISO is generally shown at 10. ISO's 10 internal software objects allow each ISO 10 to represent almost anything imaginable. The attributes of an exemplary ISO 10 are first described in general, followed by descriptions of exemplary organization of specific ISOs 10.

ISO 10 is the basic building block component of the present invention's adaptive process control optimization system 1. Each ISO 10 can represent and model physical things, abstract things, or conceptual things, and initially comprises a plurality of internal software objects, more fully described herein below, which can be enabled, disabled, or not configured at all. ISO's 10 internal software objects include: expert system objects 12 capable of utilizing one or more rules knowledge bases 13 containing crisp logic rules 14 and/or fuzzy logic rules 16; adaptive models objects 20 which can use multiple, concurrent, differing modeling methodologies to produce adaptive models which "compete" in real time with each other adaptive model within ISO 10 to predict a real-time process outcome based on current, past, and predicted process parameters; predictor objects 18 which select from the adaptive models objects' 20 competing adaptive models that adaptive model which bests predicts the measured real-time process outcome; optimizer objects 22 which optimize parameters to be used by an ISO 10 for a given state of the process, calculation, or component to be optimized; communication translator objects 26 which can handle communications between an ISO 10 and anything outside ISO 10; and sensor objects 25 which, in part, act as intelligent data storage and retrieval warehouses.

Although internal software objects' functionalities are present in an ISO 10, enabling of these functionalities is configurably left to a user or, optionally, to ISO 10 itself through its expert system objects 12. The instant invention's adaptive, object-oriented optimization software's user interface, more fully described herein below, initially presents a user with an initial set of ISO 10 internal software objects; users then configure specific ISOs 10 or groups of ISOs 10 from this initial set of possible internal software objects to represent, model, and relate ISO 10 to processes, concrete components (e.g., an automobile) or abstract components (e.g., a miles per gallon calculation) to represent real life or abstract processes such as plants, procedures, ideas, or systems. Mechanical devices, electrical devices, controllable processes, abstract calculations, or almost anything to be controlled or optimized can be represented by ISO 10.

As used herein expert systems are defined as specialized control programs that use inference engines and programmed rules to approximate the actions of an expert human operator in calculating and implementing a set of steps. Examples may include setting virtually optimum set points for a processing unit, switching valves to line up a preferred equipment configuration, positioning recycle valves to virtually minimize energy consumption while simultaneously providing for surge or cavitation control depending on calculated process conditions.

In a preferred embodiment, the expert system objects 12; may provide data validation. As those skilled in the art understand, data validation may include input, output and values internally calculated by the adaptive process control optimization system 1 or the DCS 2. For example, an expert system object 12 may determine whether an input value, received from a real-world device 100 such as a thermocouple, is out of range or not in working order. The expert system object 12 may alert a human operator of the out of range value. Optionally, but preferably the expert system calculates an estimate to substitute for the input value that is out of range (e.g., averaging or substituting any redundant thermocouple readings or calculating an estimated change in temperature per tray in a distillation column and applying the correction from another thermocouple located on another tray in the column). Thus, an advantage of the present invention may include using at least one expert system software object to provide an associated rules knowledge base for validation of the current data, which may include data from real-world instrumentation 100, preferably, on-line sensors or analyzers or relevant lab data or other manual entries.

In another preferred embodiment the expert system objects 12, may determine a process upset condition. Upon determining a process upset condition, the expert system objects 12 may alert operators through the communication translator objects 26 to the DCS 2 or by activating another process alarm. Additionally, this preferred embodiment may hold a chemical addition rate at the last valid rate or at a predetermined rate.

The expert system object 12 used by the inventive method may also validate control commands such as set points output from the adaptive process control optimization system 1 to the DCS 2 or those set points generated internally by either system. More preferably, for set points that are not validated, the expert system object 12 recalculates virtually optimum set points taking into account process constraints, and notifying an operator that process constraints have limited control action. Preferably, the expert system object 12 validates any outputs directed to real-world devices 100 or the DCS 2 from the adaptive process control optimization system 1. Optionally, the expert system object 12 may also validate outputs from the DCS 2 to real-world devices 100.

In a preferred embodiment, only one expert system object 12 is present. Expert system objects 12 can use one or more rules knowledge bases 13. Expert system objects 12 provide an intelligent scripting environment for influencing ISO's 10 behavior within the instant invention's adaptive process control optimization system 1, as well as for achieving and actuating ISO's 10 modeling, predicting, optimizing, and controlling. Further, expert system objects 12 provide a scripting environment for sensor objects' 25 intelligent retention of data ISO 10 encounters or generates over time. Expert system objects 12 can "remember" by storing data regarding their own operation. These data may be accessible to other internal software objects in the same ISO 10 as the expert system objects 12 or to other ISOs 10.

As those skilled in the art will understand, an expert system's rules, either fuzzy or crisp, reflect components of human experts' knowledge, textbook relationships, process models, and local plant knowledge. As further shown in FIG. 1, expert system objects' 12 rules knowledge bases 13 can use either crisp rules 14, fuzzy rules 16, or both to define knowledge of itself and its state variables, define knowledge regarding the interaction of an ISO's 10 internal software objects within ISO 10, define knowledge regarding interaction with other ISOs 10, and define meta-knowledge of itself and how it is to become "alive" within the computing environment and within the adaptive process control optimization system 1. Expert system objects 12 also provide the ability to make choices, given a full set of past, present and predicted values of itself (e.g., its state), and act according to the choices made to affect ISO's 10 behavior. Expert system objects' 12 rules knowledge bases 13 comprise linguistic, mathematical, and/or symbolic rules, described in either crisp or fuzzy terms, which are user configurable and can include business rules (e.g., if cost-per-unit>4 then use-cheaper-material) as well as more familiar control rules (e.g., if condition=overflow then turn-on-valve). Further, fuzzy terms may embody both the use of fuzzy syntax and fuzzy logic constructs such as fuzzy logic membership functions and fuzzy sets.

A key to incorporating a process model in an adaptive process control optimization system 1 is to assure that the process model accurately predicts the performance of the modeled process over time. Thus, a key feature of each ISO 10 is the inclusion of functionality without limiting the methodology for accomplishing or providing that functionality. Adaptive models objects 20 can use a number of concurrent, adaptive modeling methodologies to provide desired flexibility, e.g., empirical models, phenomenological models, first principles models, system identification models, neural networks, linear regression, and other modeling methodologies. The ability of adaptive model objects 20 to use concurrently one or more differing modeling methodologies is an advantage of the instant invention. Because adaptive models objects 20 can use differing model methodologies, the actual methodology may adoptively and automatically change over time so that the methodology more accurately and effectively adapts to its designed task.

In accordance with this aspect of the present invention, the foregoing advantages may be achieved by providing at least one adaptive model software object which further provides one or more modeling methodologies for calculating a key performance indicator based upon the current data, historical data, and statistical data. The key performance indicator may directly or indirectly represent a process condition (e.g., the corrosive conditions produced by the process, foaming conditions produced by the process, azeotropic conditions produced by the process, etc.) which may vary with time. Optionally, key performance indicators may directly or indirectly represent product specifications (e.g., pour point, cloud point, lubricity, conductivity, etc.) Optionally, the process condition represented by the key performance indicator may have an integrated effect over time, such as variable corrosion rates over time on a metal plate. The integrated effect calculated by ISO 10 may be used to by predictor objects 18 to alert a user through the DCS 2 that predicted corrosion losses (e.g., mils per year) are at a level requiring a maintenance check.

Other key performance indicators may include emulsifying conditions; conditions conducive to byproduct formation; metals passivation, residual chemical levels in a process fluid; conditions conducive to biological growth; conditions conducive to salt removal from hydrocarbons; conditions conducive to promoting reactions (e.g. alkylation); conditions conducive to treatment of waste water; conditions conducive to treatment of finished fuels; fouling conditions, corrosion conditions, and indicates product stability, including but not limited to pyrolysis gasoline; and the like.

The present inventive method of adjusting chemical addition rates may control these key performance indicators at a virtually global optimum. A feature of this aspect of the present invention could be to control product specification key performance indicators. For example, addition of fuel additives to fuel product streams such as cetane improvers, antioxidants, lubricity improvers and the like added and controlled by the present invention may result in reduced product quality variances.

Another feature of this aspect of the present invention could be to optimize chemical addition rates to improve product yields and run times of chemical reactors. For example, chemicals may be added to a reactor feed that may lay down on the catalyst surfaces, poisoning nickel and/or vanadium in the catalysts and reducing the efficiency of catalyst, such as those used in fluidized catalytic crackers. The improved efficiency of the catalyst may increase product yields and lengthen the run time of the reactor itself. For example, the optimized chemical addition rate may aid in reducing cracking to undesired byproducts such as coke and hydrogen by maintaining the selectivity of the catalyst to produce the desired fuel products. The higher yields could allow the reactor to be operated for a longer time before replacing the catalyst, resulting in longer run times and less frequent shut downs to change the catalyst. Increased unit safety may also result due to fewer startups and shut downs of the unit.

A further feature of this aspect of the present invention to utilize at least one of the optimizer software objects to provide a desired chemical addition rate to the process may include addition of scavengers (e.g. oxygen and hydrogen sulfide) or flocculants such as used in waste water treatment. A further feature may include at least one of the data communications protocols enabling the process control optimization system to output a value to the distributed control system representing the desired chemical addition rate to the process. The method may further utilize at least one expert system software object to provide an associated rules knowledge base to make a decision to authenticate the desired chemical addition rate to the process and output the value to the distributed control system or to reject the desired chemical rate provided by at least one of the optimizer software objects and to provide an newly calculated desired chemical addition rate. For example, the newly calculated desired chemical addition rate may provide at least one adaptive intervention as an input to DCS 2. The DCS 2 may utilize this adaptive intervention for controlling the process directly through the DCS on-line or may be used to alert an operator to take an off-line action such as manually opening a chemical addition valve in the field preferably having a local flow meter to guide the manual action.

In one preferred embodiment, adaptive model objects 20 use neural networks as their preferred methodology. Adaptive models objects' 20 neural networks "learn" to make decisions through the neural network's ability to adjust the weights and/or the connective organization of the neural network from data experienced, thereby producing "strained" models. Adaptive models objects 20 train or learn using a training process that corresponds to the methodology of that adaptive models object 20; differing adaptive model methodologies have differing training processes. However, in general, an adaptive models object 20 uses the inputs of each entry in a set of the training data associated with the adaptive models object 20 to simulate, calculate or predict the corresponding outputs to that entry in the training data set. Adaptive models objects 20 use the training process to update the model parameters to minimize the difference between the predicted corresponding outputs that the adaptive models object 20 generated and the recorded outputs. After the appropriate training has occurred, adaptive models object 20 may validate a trained adaptive model generated using a set of test data. The adaptive models object 20 simulates, calculates, or predicts the corresponding output for each entry in the test data set, and uses the difference or error between the corresponding and recorded outputs that the adaptive model generated and the entry in the test data set to determine the ability of the adaptive model to accurately simulate or predict the process.

A further feature of this aspect of the present invention may include using ISO's 10 to automatically correct for error in a trained adaptive model by tracking offsets between the best model 60 output and corresponding lab data. For example, for a key performance indicator such as oxygen stability, the error between the ASTM-525 lab data and the calculated value of the best model 60 may be input to an adaptive models object 20 to update automatically the individual adaptive model selected by the predictor object 18 at the time for which the offset was determined. Thus, the offset between the oxygen stability measurement calculated at the time the lab sample was withdrawn and subsequently measured may be reduced.

Each ISO 10 has input state variables. Data presented to the adaptive model(s) may include input state variables used to initialize the model(s); real-world state variables; output state variables, including data produced by the adaptive model(s); and control state variables, which are data associated with goals and objectives. Each ISO 10 includes the ability to predict its future state, given current conditions and a statement of desired future conditions, through one or more predictor objects 18 and one or more adaptive models objects 20.

Using its differing methodologies, adaptive models objects 20 produce a variety of differing, "competing" adaptive models which try to accomplish a specific task in the best way possible; predictor objects 18 associated with adaptive models objects 20 then selects the individual adaptive model that best fits the actual data for a given sampling delta. Predictor objects 18 provide at least one predictor selection criteria to select the individual adaptive model from the differing "competing" adaptive models. Selection criteria may be based upon the model having the best fit for one particular model parameter or may be based upon the best fit of a weighted sum of errors for several model parameters.

A sampling delta can be time, as in the preferred embodiment, but can be any delta (e.g., changes in mass, volume, color, flow rate, temperature, pressure stability, sound, or dollars). Predictor objects 18 and adaptive models objects 20 have the ability to "learn" how to model the processes they represent by interrogating sensor objects 25, as well as other ISOs 10 and their sensor objects 25, for data required by the training methodologies used by predictor objects 18 and adaptive models objects 20. Predictor objects 20 can "remember" by storing data regarding their own operation. These data may be accessible to other internal software objects in the same ISO 10 as the predictor objects 20 or to other ISOs 10.

Although individual adaptive models compete with each other, ISOs 10 cooperate with ISOs 10 of the same or differing hierarchical levels by teaching the other ISOs 10, i.e. providing the other ISOs 10 with trained models 24, thereby allowing a given ISO 10 to use another ISO's 10 trained models 24 and cooperating to accomplish the adaptive, object-oriented software system's goals and functionality.

Errors in the trained models 24 may be the result of different operating modes such as when using different feedstocks. The different operating modes could result in a large offset exhibited by the best model 60. A large offset could result in an expert system object 12 activating an optimizer object 22 to procreate a new ISO 10. This could be accomplished by using an expert system object 12 programmed rule knowledge base 13 to create a new model for the different operating mode once the offset exceeds a predetermined limit. Adaptive models objects 20 can "remember" by storing data, including trained adaptive models, regarding their own operation. These data may be accessible to other internal software objects in the same ISO 10 as the adaptive model objects 20 or to other ISOs 10. The optimizer object 22 may use the stored data in an adaptive models object 20 to train the newly created model. The predictor object 18 would then select the best model 60 based on the identified operating mode.

Optimizing process control systems preferably make optimizing control actions in a manner that is consistent with management objectives and goals. In the instant invention, optimizer objects 22 use predictor objects' 18 selected adaptive model(s) which best model the process associated with that optimizer object 22, given the current state(s) of the ISO's 10 inputs, to determine or calculate optimized values to use to achieve desired ISO 10 future state conditions, e.g. control set points, valve line-up, batch size, etc. Optimizer objects 22 can use a number of optimization methodologies; in the preferred embodiment, optimizer objects 22 use genetic algorithms to provide their adaptation ability.

Optimizer objects 22 can also influence other ISO 10 internal software objects. For example, optimizer objects 22 can influence expert system objects 12 by modifying expert system objects' 12 rules, fuzzy logic membership functions, or fuzzy sets, or can influence an adaptive models object 20 by modifying the adaptive modeling methodology to be used. Optimizer objects 22 can "remember" by storing data regarding their own operation. These data may be accessible to other internal software objects in the same ISO 10 as the optimizer objects 22 or to other ISOs 10.

ISOs 10 can also contain any number of sensor objects 25 to collect, store, and manage input and output state(s) for ISO 10. Sensor objects 25 act as data storage and retrieval moderators capable of providing ISO 10 and its internal software objects with data reflecting the current values of state variables, predicted values of state variables and historical values of state variables. Each sensor object 25 can include built-in state variables, including state variables that represent the world outside ISO's 10 software representation of itself (i.e., real-world device state variables), state variables that are determined by itself (i.e., algorithmically), and state variables that are given it by other ISOs 10, or input through a human interface (e.g., lab and economic update data). Economic state variables are an important ability of each ISO 10. An economic state variable is a new state that is based on a calculated value, e.g. "per unit", or cost of another state variable. Sensor objects 25 also maintain historical and statistical knowledge of ISO's 10 own state variables, including ISO's 10 built-in representation and knowledge of its values and costs.

As moderators, sensor objects 25 can filter, compute, and statistically manipulate data as well as store data and provide stored data for ISO's 10 use. ISO 10 maintains one sensor object 25 for each of its state variables, including one for each real-world device 100 for which ISO 10 has responsibility. Sensor objects 25 can include "input" sensors which relate to and manage data received as input by ISO 10, and "output" sensors, which relate to and manage data output by or within ISO 10; using communication translator objects 26, data in sensor objects 25 can be related to real-world devices 100 such as real-world instruments 30, control devices 32 or actuators 35, thereby creating the link between ISO 10 and the world. Sensor objects 25 can store and moderate data as a single value, e.g., "1", or as a set or range of values, e.g., a variable, color, comprising a set of red, blue, and green values, or as an array of values, e.g., product recipes. Sensor objects 25 are also ISO's 10 main internal software object that allows user interface with an ISO's 10 data.

Additionally, sensor objects 25 store an ISO's 10 adaptive model predictions, adaptive model parameters, and/or adaptive model states for use within ISO 10. ISO 10 also maintains the outputs or results from all predictor objects 18 and optimizer objects 22 as ISO 10 states. Expert system objects 12 can integrate and use sensor objects' 25 data in accomplishing the goals described by the rules contained within the expert system objects 12. Although a sensor objects' 25 data is normally integer, floating point, string, symbol, logical, or an array of any of these, sensor objects 25 can store an entire ISO 10, any of an ISO's 10 internal software objects, or a list of ISOs 10 or their internal software objects.

As further shown in FIG. 1, each ISO 10 further comprises communication translator objects 26. Communication translator objects 26 are capable of synchronously or asynchronously communicating between an ISO 10 and a given real-world process or component to be monitored and controlled in real-time, between an ISO 10 and a source of abstract data (e.g. a calculated or simulated data source), and/or between an ISO 10 and other ISOs 10. Accordingly, communication translator objects 26 are capable of synchronous or asynchronous communications via serial, parallel, local area network, wide area network, and other hardware interfaces as required by the adaptive process control optimization system 1 including but not limited to radio frequency (RF) techniques, modems, satellite, wires, fiber optics, and telemetry.

The communication translator object's 26 communications can be either coded or non-coded, depending on the abilities of the receiving entity. Communications between ISOs 10 are coded in a protocol specific to ISOs 10. Communication between ISOs 10 and non-ISOs can be of any protocol required by that non-ISO (e.g. visual and non visual representation of numbers, alphanumeric text, strings, images, and sound), and include serial data, parallel data, local area network, and wide area network protocols. As an ISO 10 encounters new input sources, communication translator objects 26 also provide a framework by which new ways of communicating can be continually added to an ISO 10. Communication translator objects 26 can "remember" by storing data regarding their own operation. These data may be accessible to other internal software objects in the same ISO 10 as the communication translator objects 26 or to other ISOs 10.

Although ISOs 10 normally communicate with other ISOs 10 and real-world devices through communication translators 26, ISO's 10 internal software components know about the attributes and behaviors of ISO's 10 internal software objects and can communicate directly with other ISOs' 10 internal software components. For example, optimizer objects 22 in one ISO 10, having an awareness and knowledge of how they, as optimizer objects 22, require data, can pass data to another ISO's 10 optimizer object 22 without the need for an intervening communication translator 26, if so configured.

Each ISO 10 interacts with its environment and other ISOs 10 in a variety of ways. In one preferred embodiment, an ISO 10 has the ability to procreate itself, or copy itself, or be copied, given its meta-knowledge of itself including rules regarding itself and how it interacts with the computer environment and other ISOs 10. ISO 10 in effect lives and acts in a distributed sense, given the computing environment's ability to support concurrent and/or distributed processing; accordingly, ISO 10 can be created and "live" anywhere within one or more computer systems and interact with other ISOs 10 that are also anywhere within that computer system or those computer systems provided that the computer system provides a communication means which is either externally or internally controlled. In this manner, ISOs 10 can be connected to, embedded within, or hierarchically envelop physical things which have processes to be controlled. For example, ISOs 10 can be embedded (physically sited) in a physical device, thereby providing sensory input for the ISOs' 10 state and the state of the other ISOs 10 outside the physical device in which it is embedded, transforming the physical entity containing ISOs 10 into an intelligent physical entity. This physical siting of an ISO 10 within a physical device has particular application to the field of robotics.

Further, ISO 10, using sensor objects' 25 data, predictor objects 18 and adaptive models objects 20, can also simulate and/or predict future process performance as well as determine the effectiveness of ISO's 10 modeling of future process performance. In one preferred embodiment, the adaptive process control optimization system 1 may therefore be used in a simulation mode. In the simulation mode, simulated and/or calculated real-world data may be used in place of data from real-world devices. Simulation of real or abstract systems occurs by having an ISO 10 evaluate or interrogate a model of a real or abstract thing or system or evaluate and/or interact with rules associated with the real or abstract thing.

A user can initially, configurably, or in real time interface with ISO 10 to modify or otherwise alter rules, goals, and optimization criteria. Additionally, expert system objects 12, optimizer objects 22, predictor objects 18, and adaptive models objects 20 communicate and configurably interact with each other adaptively, automatically changing each other's behavior in real time, preferably without human intervention, including creating and deleting other internal software projects; for example, an optimizer object 22 can modify expert system objects' 12 rules knowledge bases 13, and an expert system object 12 can modify optimizer objects' 22 goals to be sought.

Given the adaptive nature of ISOs 10, the instant invention's adaptive process control optimization system 1 has the ability to create new solutions to given problems. Expert system objects 12, acting within the knowledge, objectives and goals and procedures contained within the expert system objects' 12 rules knowledge bases 13 and specific ISO 10 state values, can create, modify, or even destroy predictor objects 18, adaptive models objects 20, optimizer objects 22, communication translator objects 26, and sensor objects 25. The ability of an ISO's 10 internal software objects to modify other ISO 10 internal objects' rules, methods, and optimization criteria allows an adaptive process control optimization system 1 made of ISOs 10 to dynamically change its models and achieve optimization in real-time without having to stop the process being controlled or the process control systems 1,2.

ISO's 10 continuous mapping and restructuring of input/output relationships constitutes "learning." Any of the rules, models, and equations used by ISO 10 can be represented in a form that ISO 10 can automatically adapt and change over time in response to built-in measuring of error between model predictions and the actual real-world device readings that occur after the predictions are made. Preferably, the model predictions are individually fit in time, e.g., offset, to the corresponding actual real-world device readings so that process parameters with typically long lags and/or dead times (e.g. temperature, stability, composition, etc.) versus process parameters with typically short lags and/or dead times (e.g. flow, pressure, etc.) are appropriately compared. Optionally, and also preferably, the models continuously modify the offset to correspond to changing loads, e.g. feed rates through equipment with fixed sizes. Accordingly, regardless of the model type, ISO 10 can continuously modify its models to better map these models to the multi-dimensional reality that is being continuously logged by each of its sensor objects 25.

Preferably, adaptive model objects 20 allow optimizer objects 22 to determine "optimum conditions" for a given sampling delta. If the adaptive models objects' 20 models include design parameters that describe the physical design and functionality of the entity represented by ISO 10 and that affect performance, ISO's 10 optimization methods can actually be used to invent better ways for ISO 10 to do its basic tasks.

Each ISO 10 is also given a definition of its own "fitness" or performance objectives or goals; fitness, i.e. localized performance objectives and goals, can be economically based, mathematical function based, rules based, or arbitrarily defined by a human user when configuring ISO 10. Preferably, these objectives or goals are defined and activated during initial configuration either by a human user or by software scripting templates, but can also be altered in real-time by a human user, expert system object(s) 12 using its rules knowledge base 13, or optimizer object(s) 22.

ISOs 10 can also influence other ISOs 10 in the instant invention's adaptive process control optimization system 1. In addition to training its own models, ISOs 10 can train or teach other ISOs 10 by giving to the other ISOs 10 trained models 24, rule sets, fuzzy logic membership functions, or objects and goals used by the communicating ISO 10 to the other ISOs' 10 optimizer object(s) 22 that the sending ISOs 10 has deemed to be effective and correct. An ISO 10 can also teach by mapping coded representations (e.g., mathematical models) to a representation that is understood by a receiving entity. An example of this is mapping a multidimensional surface of ISO 10 inputs to outputs in linguistic terms that include either crisp representations or fuzzy representations. It is also possible to go from linguistic representations to mathematical ones and plot the results in two, three, or four dimensional forms.

Similarly, an ISO 10 can influence other ISOs 10 objectives and goals in the adaptive process control optimization system 1 by communicating fitness or performance objectives and goals to those ISOs 10. A preferred embodiment of the present invention whereby an ISO 10 influences other ISOs 10 objectives and goals combines expert systems, genetic algorithms and neural networks. A preferred embodiment of the present invention is a method for adding chemicals to a process may include the steps of (a) providing current data, historical data and statistical data to a process control optimization system; (b) validating the current data using an expert system; (c) predicting a process target utilizing a neural network; (d) calculating a manipulated variable set point based upon the process target predicted in (c) using a genetic algorithm; (e) utilizing an expert system to provide a validated manipulated variable set point wherein the validated manipulated variable set point is the result of (d) or recalculated by the expert system utilizing an alternate associated rules knowledge base; and (f) regulating an actuator which directly or indirectly controls the manipulated variable of the process in response to the validated manipulated variable set point.

A further feature of this aspect of the present invention is that the process target of step (c) may be influenced by adding a chemical or a mixture of chemicals to the process. The present inventive method may include using the manipulated variable set point of step (d) as a chemical addition rate set point. The present inventive method of chemical addition may include using the validated manipulated variable set point of step (e) as a chemical addition rate set point for the process. Another feature of this aspect of the present invention may include using the manipulated variable of step (f) as a chemical addition rate.

Another feature of this aspect of the present invention is that the process may utilize a feed selected from a process stream, including a solid feed, a liquid feed, a vapor feed, a supercritical feed or mixtures thereof. For purposes of this specification a feed may include any process stream. An additional feature of the present invention is that the process may utilize a feed selected from an organic feed, an aqueous feed, an inorganic feed or mixtures thereof.

The present inventive method may utilize process apparatus including but not limited to an atmospheric vessel, a furnace, a pressurized vessel, a reactor, a vacuum containing vessel, an extraction column, a fractionation column, biological reactor, column internals, a flash drum, a phase separator, a boiler, a desalter, a wash drum, a reboiler, a condenser, a heat exchanger, cooling tower internals, process piping, compressor internals, pump internals, or a valve. A preferred embodiment may include controlling chemical addition to aid separation processes in process apparatus such as API separators or other gravity separation apparatus used in waste water treatment or oil and gas operations. Other preferred embodiments might control chemical addition to improve separation operations in filters and centrifuges.

Another feature of the present invention is a method of retarding or inhibiting fouling or corrosion which may include providing current data, historical data and statistical data to a process control optimization system. The fouling may be a result of organic or inorganic deposition, including but not limited to, corrosion products or deposition of reaction products such as gums or coke. For purposes of this invention retarding or inhibiting shall both be considered to mean to prevent or slow a particular process reaction.

A preferred embodiment of the present invention is a method of retarding fouling which may include the steps of (a) providing current data, historical data and statistical data to a process control optimization system, the data relating to a state variable indicating a fouling rate and wherein the process utilizes an antifoulant; (b) validating the current data using an expert system; (c) predicting a process target indicative of the fouling rate utilizing a neural network; (d) calculating a manipulated variable set point based upon the process target predicted in step (c) using a genetic algorithm; (e) determining a validated manipulated variable set point utilizing an expert system; (f) regulating an actuator which directly or indirectly controls a manipulated variable of the process in response to the validated manipulated variable set point.

Another feature of this aspect of the present invention could retard fouling by biological growth such as in cooling water systems or deposition of wax crystals in process equipment or piping. The data relating to a state variable indicating a variable fouling rate may be based on real world devices, lab data, calculated state variables and/or and other manual data input. The process may utilize antifoulants (e.g., antioxidants, antipolymerants, metal deactivators, biocides, dispersants. etc.) which may be used individually or in any combination. The processing apparatus used may have a surface which is subject to a variable fouling or corrosion rate for which the rates may be integrated over time intervals to predict actual fouling or corrosion the of the surface. Optionally, but preferably, fouling or corrosion predictions may be used in preventative maintenance plans (e.g. to alert or advise personnel to replace or repair processing equipment). Optionally, the current data may be validated by using an expert system before being further utilized by any ISO's 10.

If upset conditions or out of range values of the current data are detected by the expert system, state variables may be frozen at values previous to the upset condition or out of range value detection or predetermined values may be substituted for affected state variables. Neural networks may be used to predict a process targets indicative of the fouling or corrosion rate and manipulated variable set points may be calculated based upon the process targets predicted in step (c) using a genetic algorithm. The expert system may also be used to determine a validated manipulated variable set point which may be used in regulating an actuator which directly or indirectly controls the manipulated variable of the process in response to the validated manipulated variable set point.

A preferred embodiment of the present invention is a method of retarding or inhibiting corrosion in a process which may include the steps of (a) providing current data, historical data and statistical data to a process control optimization system, the data relating to a state variable indicating a corrosion rate and wherein the process utilizes a corrosion inhibitor; (b) validating the current data using an expert system; (c) predicting a process target indicative of the corrosion rate utilizing a neural network; (d) calculating a manipulated variable set point based upon the process target predicted in step (c) using a genetic algorithm; (e) determining a validated manipulated variable set point utilizing an expert system; (f) regulating an actuator which directly or indirectly controls a manipulated variable of the process in response to the validated manipulated variable set point. Another feature of this aspect of the present invention could retard fouling by biological growth such as in cooling water systems or deposition of wax crystals in process equipment or piping.

In accordance with another aspect of the present invention, a method of promoting alkylation may be provided. This method may include the steps of (a) providing current data, historical data and statistical data to a process control optimization system, the data relating to a state variable indicating alkylation efficiency where the process uses a chemical aid to vary alkylation efficiency; (b) validating the current data using an expert system; (c) predicting a process target indicative of the alkylation efficiency utilizing a neural network; (d) calculating a manipulated variable set point based upon the process target predicted in step (c) using a genetic algorithm; (e) determining a validated manipulated variable set point utilizing an expert system; (f) regulating an actuator which directly or indirectly controls a manipulated variable of the process in response to the validated manipulated variable set point.

In accordance with another aspect of the present invention, a method of promoting demulsification may be provided. This method may include the steps of (a) providing current data, historical data and statistical data to a process control optimization system, the data relating to a state variable indicating demulsification and wherein the process utilizes a demulsifier; (b) validating the current data using an expert system; (c)predicting a process target indicative of the demulsification utilizing a neural network; (d) calculating a manipulated variable set point based upon the process target predicted in step (c) using a genetic algorithm; (e) determining a validated manipulated variable set point based utilizing an expert system; (f) regulating an actuator which directly or indirectly controls a manipulated variable of the process in response to the validated manipulated variable set point. The inventive method of demulsification may be used in process demulsifiers and waste water treatment demulsifiers. For example, the emulsion may contain a dispersed phase of water in a continuous phase of hydrocarbon such as generally found in a process demulsifier. Alternatively, the emulsion may contain a dispersed phase of hydrocarbon in a continuous phase of water, commonly known as an invert or reverse emulsion, as generally found in a waster water demulsifier.

The instant invention may also use an intuitive, graphical user interface, which provides a formalized procedure to specify ISO 10 interconnection as well as the objective functions, fitness criteria, and goals to be handled by and within ISOs 10. To form or configure an adaptive process control optimization system 1, a human user utilizes the adaptive process control optimization system's 1 user interface to configure, define, and select which of ISO's 10 internal software objects to enable and the initial parameters, goals, and methodologies to be used by the enabled internal software objects. From an ISO's 10 initial set of parameters, goals, and methodologies, the user selects, configures, and enables a set of internal objects and defines their initial set of parameters, goals, and methodologies to produce the embodiment of the relationship(s) between that ISO 10 and either the process sought to be monitored and virtually optimally controlled or other ISOs 10. The user continues this process until the user is satisfied that the process sought to be controlled is adequately modeled.

Figure 25:
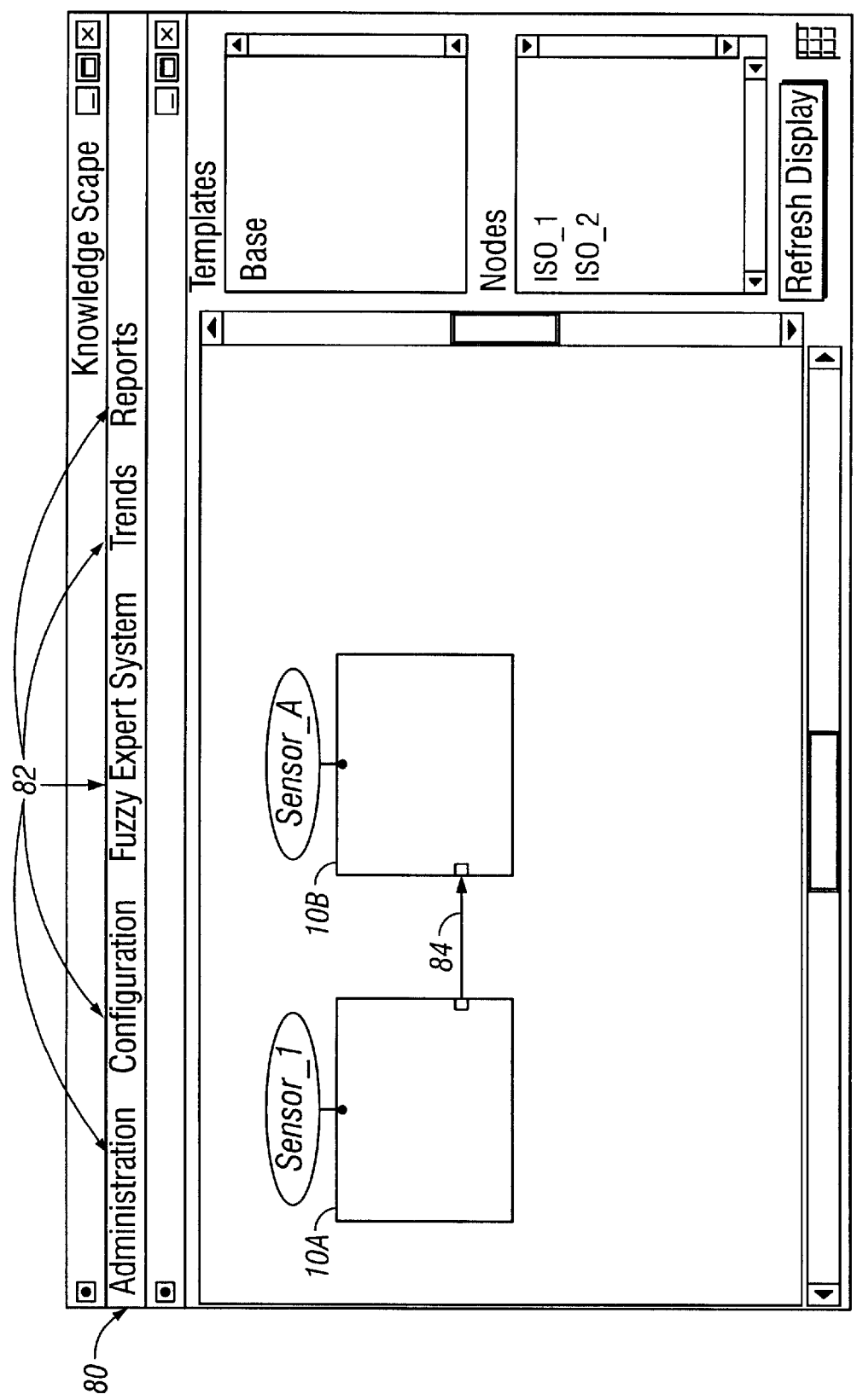
FIG. 25 is a representation of the instant invention's graphical user interface illustrating how a user relates a first ISO to a second ISO through flow connections.

Optionally, as illustrated in FIG. Nos. 2 through 8, users can configure two or more ISOs 10 or groups of ISOs 10 in a manner which mimics the order of communication of information between components to be controlled (hereinafter called "flow ISOs 10") connected in a relationship that models, or representationally corresponds to the flow of the material or information which is to be controlled. The connection of flow ISOs 10 embodies characteristics that reflect the ordered flow of information or material between components (tangible or intangible), and are in communication with and maintain control over abstractions, devices, and/or real-world processes. An example of a configured flow connection 84 is illustrated in FIG. 25.

Optionally, using the instant invention's graphical user interface, the user can also configurably connect two or more ISOs 10 or groups of ISOs 10 into hierarchical sets of relationships (hereinafter "hierarchy ISOs 10"), thus defining the prioritization and scope relationships between ISOs 10 or groups of ISOs 10. A hierarchy ISO 10 logically encapsulates a group of other ISOs 10 by being configured with a higher hierarchy value, e.g. a higher priority or higher level set of optimization goals, and embodies a higher level abstraction within the adaptive process control optimization system 1. Although hierarchy ISOs 10 by definition communicate with other ISOs 10 in their hierarchy, a hierarchy ISO 10 may be configured to either communicate or not communicate with other ISOs 10, groups of ISOs 10, or real-world devices 100 not within their hierarchy.

An ISO 10 can therefore be connected as a flow ISO 10; a hierarchy ISO 10; or a "flow-hierarchy" ISO 10 which combines both flow ISO 10 and hierarchy ISO 10 characteristics. The ability to logically encapsulate (i.e. relate hierarchically) an ISO 10 within another ISO 10 permits virtually unlimited hierarchical levels within ISO 10 hierarchy. As each ISO 10 can have a virtually unlimited number of sensor objects 25, and as a virtually unlimited number of ISOs 10 can be flow connected to each other, the instant invention provides for virtually unlimited numbers of component-level process control set points. Thus, after a user has configured and initialized an adaptive process control optimization system 1, flow ISOs 10 relate to processes, devices, and abstractions to be controlled and/or optimized, e.g. a motor or cost per unit. Further, in the typical case, users configure and initialize an adaptive process control optimization system 1 into groups of flow ISOs 10 organized into a hierarchy, forming higher and higher level abstractions of the process to be controlled and optimized, in turn representing the entire system to be controlled by the instant invention's adaptive process control optimization system 1, e.g. a motor ISO 10, driveshaft ISO 10, and wheels ISOs 10 are organized into a hierarchy representing a drivetrain ISO 10, and a drivetrain ISO 10 organized with other ISOs 10 or groups of ISOs 10 to represent and control a train.

In a preferred embodiment, each ISO 10 focuses its optimization on ISO's 10 level in the hierarchy and downward; ISOs 10 on the very lowest hierarchy levels focus on and enforce highly localized optimization. Each higher level in the hierarchy enforces an increasingly less localized, more encompassing optimization (e.g., aggregate goals) until at the top of the adaptive process control optimization system 1, the highest ISO 10 in the hierarchy, the "apex," seeks high level, more general goals, and accordingly enforces a virtually global or system-level optimization. In this way, an adaptive process control optimization system 1 may be implemented with ISOs 10 provides local (component), system level, aggregate and global, goal-seeking behaviors that tie a DCS 2 together into a powerful unified adaptive process control optimization system 1 while achieving virtually the highest optimization congruent with user defined objectives and goals which can include global, aggregate business goals. The hierarchical nature of instant invention as initially configured by a user or as adaptively modified in real-time by an ISO 10 or user provides this desired optimization concurrently at all levels of the hierarchy, from specific, component-oriented, narrowly focused optimization to broad, global level optimization. It is also possible for users to flexibly, and arbitrarily, configure an ISO's 10 or an adaptive process control optimization system's 1 hierarchy differently than top-to-bottom.

One of the primary objectives of the adaptive process control optimization system 1 is to automatically employ both ISO's 10 individualized optimizing objective functions and the more globally focused, management-defined system-wide objectives and goals to determine virtually optimum process set points for the system as a whole. Accordingly, an adaptive, object-oriented software optimization system 1 preferably comprising ISOs 10 configured into flow ISO 10, hierarchy ISO 10, and ISOs that combine flow-hierarchy ISO (hereinafter "flow-hierarchy ISO 10") 10 relationships continually evaluates overall system performance with regard to the optimization goals set up for the real-time processes, automatically adapting and modifying each ISO's 10 rules and methodologies to attain user defined objectives and goals which can include global, aggregate business goals. In this manner, the instant invention automatically optimizes processes and systems consistent with management objectives and goals without the need for continuing human intervention. Because the adaptive models objects 20 can use a multiplicity of concurrent, competing modeling methodologies, an adaptive process control optimization system 1 comprised of ISOs 10 achieves concurrent multi-level optimization.

For example, a corporation may have two operating plants. The user preferably associates an ISO 10 with the corporation as a whole as the first, or highest, level hierarchy "apex" ISO 10, and associates an ISO 10 with each individual plant as the next lower, or second, level in the hierarchy. Even though each of the second level ISOs 10 may have their own optimum control objectives and goals, these respective optimum control objectives and goals may not achieve optimization of the two combined. The highest level ISO 10, may influence each of the second level ISOs 10 to optimize control objectives and goals for the corporation as a whole, rather than having each of the second level ISOs 10 independently maintain their own optimized control objectives and goals.

Optionally, an adaptive object-oriented process control optimization system 1 can be used to simulate a real-world process, enabling training of end users in operating or working on a real-world process being simulated.

In FIG. Nos. 2 through 22, reference to an ISO 10 as "ISO 10" followed by a letter or letter and number, e.g. ISO 10A or ISO 10B1, is meant to mean an instance of an ISO 10. Similarly, reference to an internal software object followed by a letter or letter and number is also meant to be an instance of the object, e.g., predictor objects 18A, sensor object 25A1 or sensor object 25A2. Also similarly, reference to a real-world device 100 followed by a letter or letter and number is also meant to be an instance of the real-world device 100, instrumentation, control device or actuator, e.g., real-world instrumentation 30E1, real-world control device 32A1 or real-world actuator 35D1.

Figure 2:
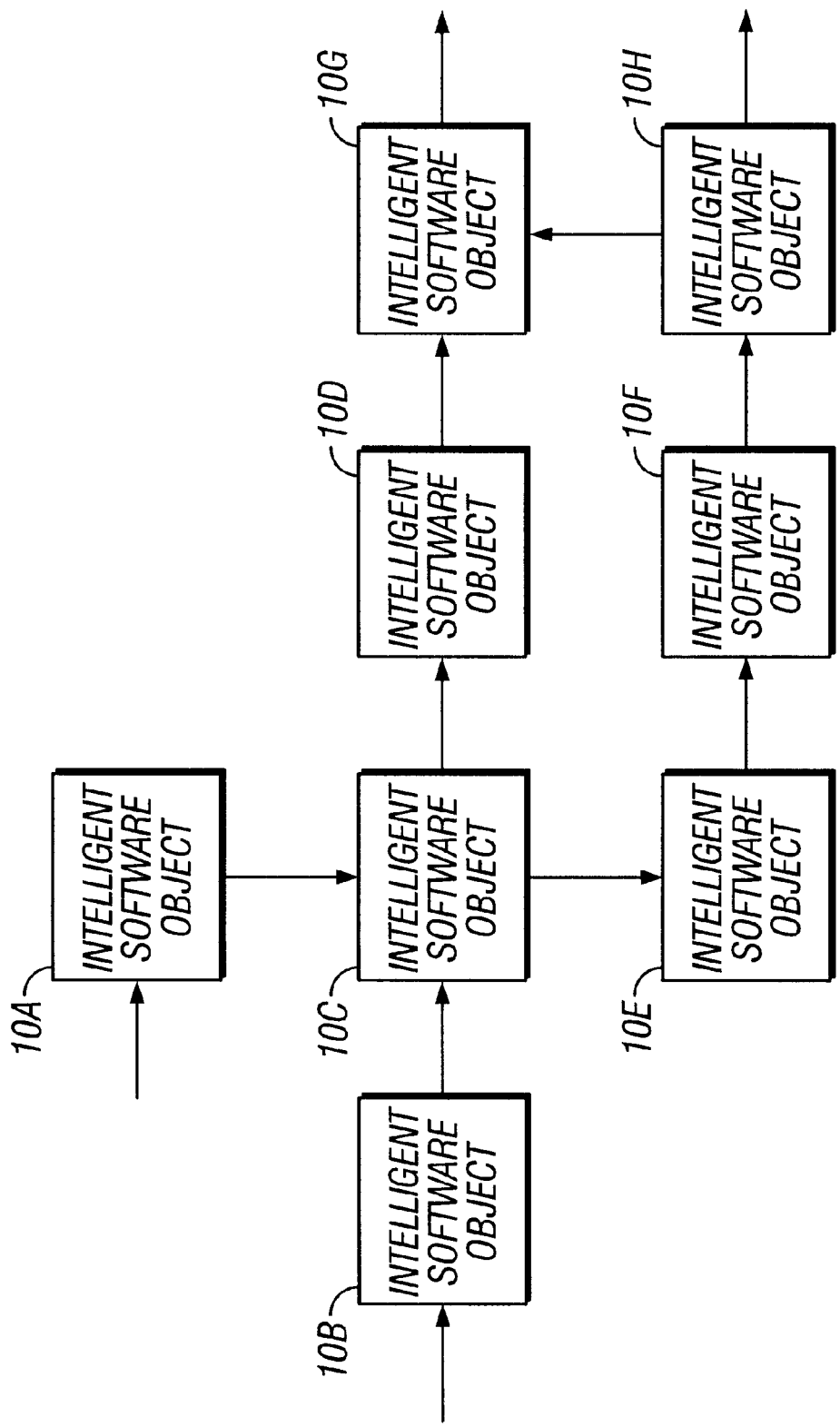
FIG. 2 is a block diagram illustrating the interconnection of one ISO to another in accordance with the present invention.

Referring to FIG. 2, ISO 10A through ISO 10H are connected as flow ISOs 10 showing ordered flow of information from one to another. The connections between ISOs 10, e.g. between ISO 10A and ISO 10C, represent the flow of concrete information from one ISO 10 to another such as information representing physical items such as parts or materials, or abstract information from one ISO 10 to another such as instructions or cost constraints.

Figure 3:
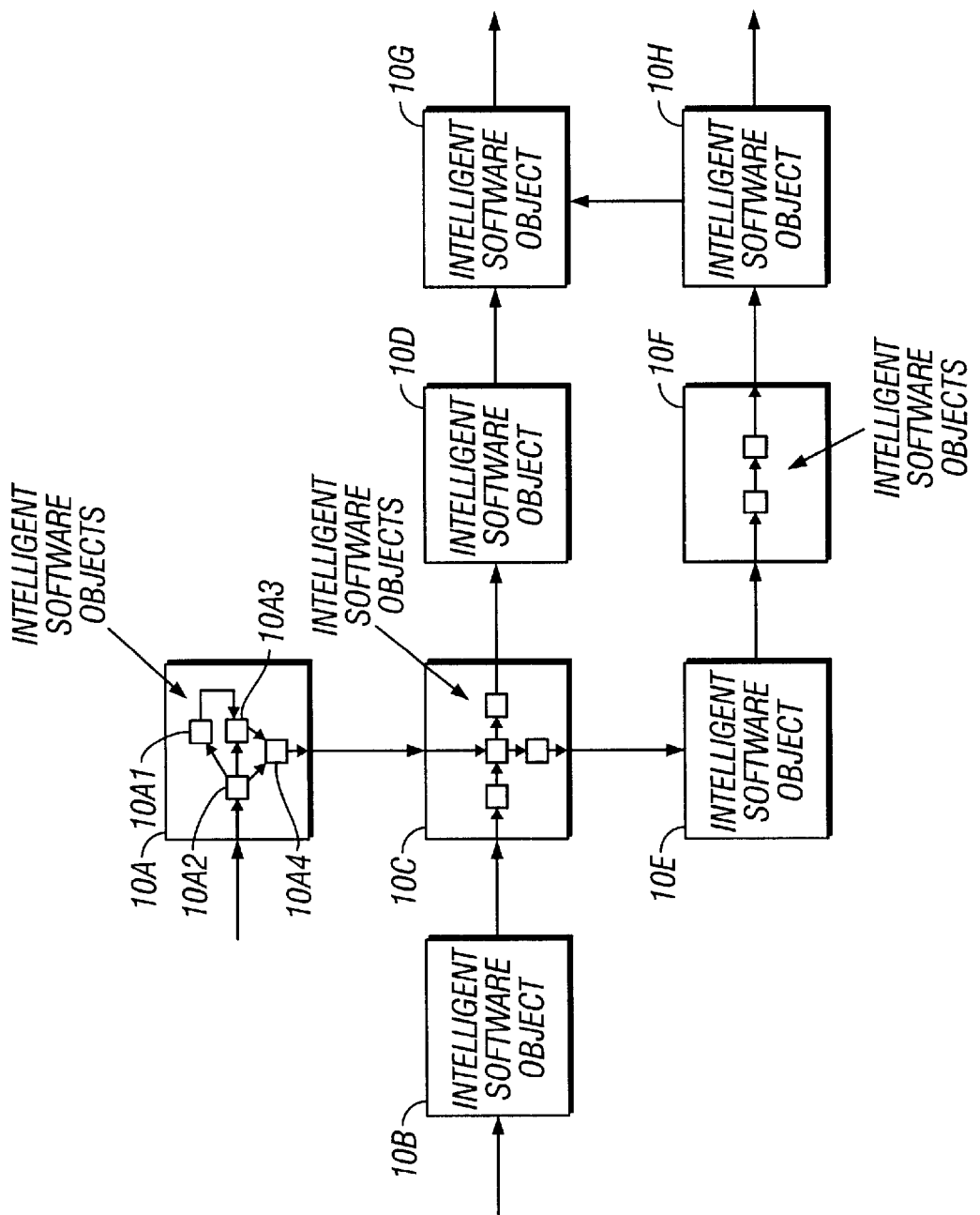
FIG. 3 is a block diagram illustrating the interconnection of ISOs located within a hierarchy with respect to other ISOs in accordance with the present invention.

Referring to FIG. 3, ISO 10 can also be configured for use as a "container," relate hierarchically for other ISOs 10, (hereinafter called container ISO 10) thus creating a hierarchy of ISOs 10 or even groups of ISOs 10. In FIG. 3, flow ISOs 10A1 through 10A4 are "contained" hierarchically within container ISO 10A to illustrate ISOs 10 contained within another ISO 10, thus creating a hierarchy between sets of ISOs 10. In this case, the internal software objects and other items associated with the container ISO 10A relate to an ISO 10 or group of ISOs 10 contained in the container ISO 10, e.g. ISO 10A1 through ISO 10A4. Container ISO's 10A internal software objects can be used to send objectives and goals, constraints or orders (instructions or directions) to the contained ISOs 10, ISO 10A1 through ISO 10A4.

Figure 4:
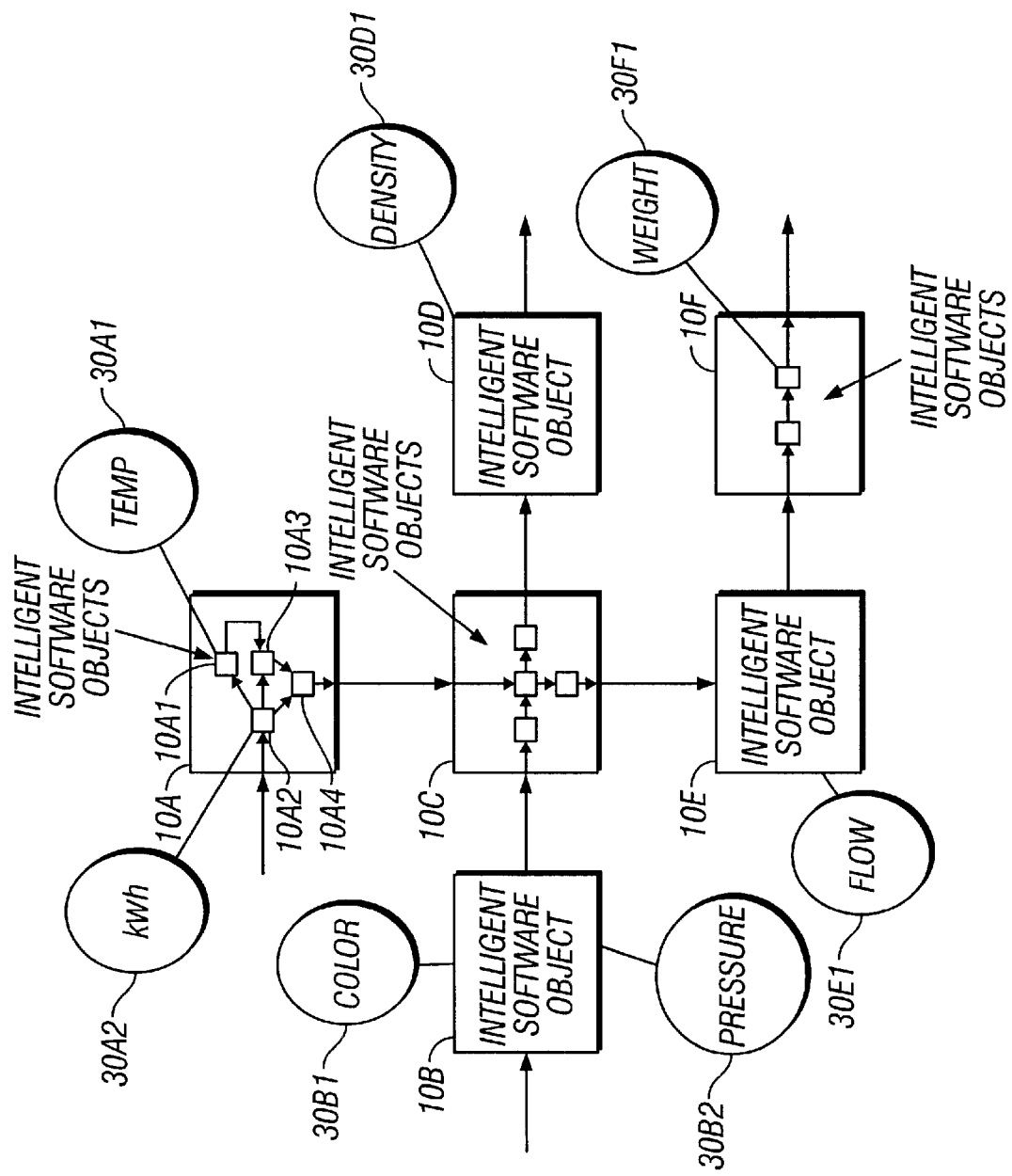
FIG. 4 is a block diagram illustrating ISOs connected to real-world devices, e.g. instrumentation in accordance with the present invention in accordance with the present invention.

Referring to FIG. 4, ISOs 10A through 10F are in communication with each other and, through communication translator objects 26 within ISOs 10A1 and 10A2, with real-world instrumentation 30A1 and real-world instrumentation 30A2 whose states are dynamically captured into sensor objects 25 in ISO 10A1 and ISO 10A2. As illustrated by ISO 10B, real-world state variables can be static, such as real-world instrumentation 30B1, which represents a color, or dynamic, such as real-world instrumentation 30B2, which represents pressure.

Figure 5:
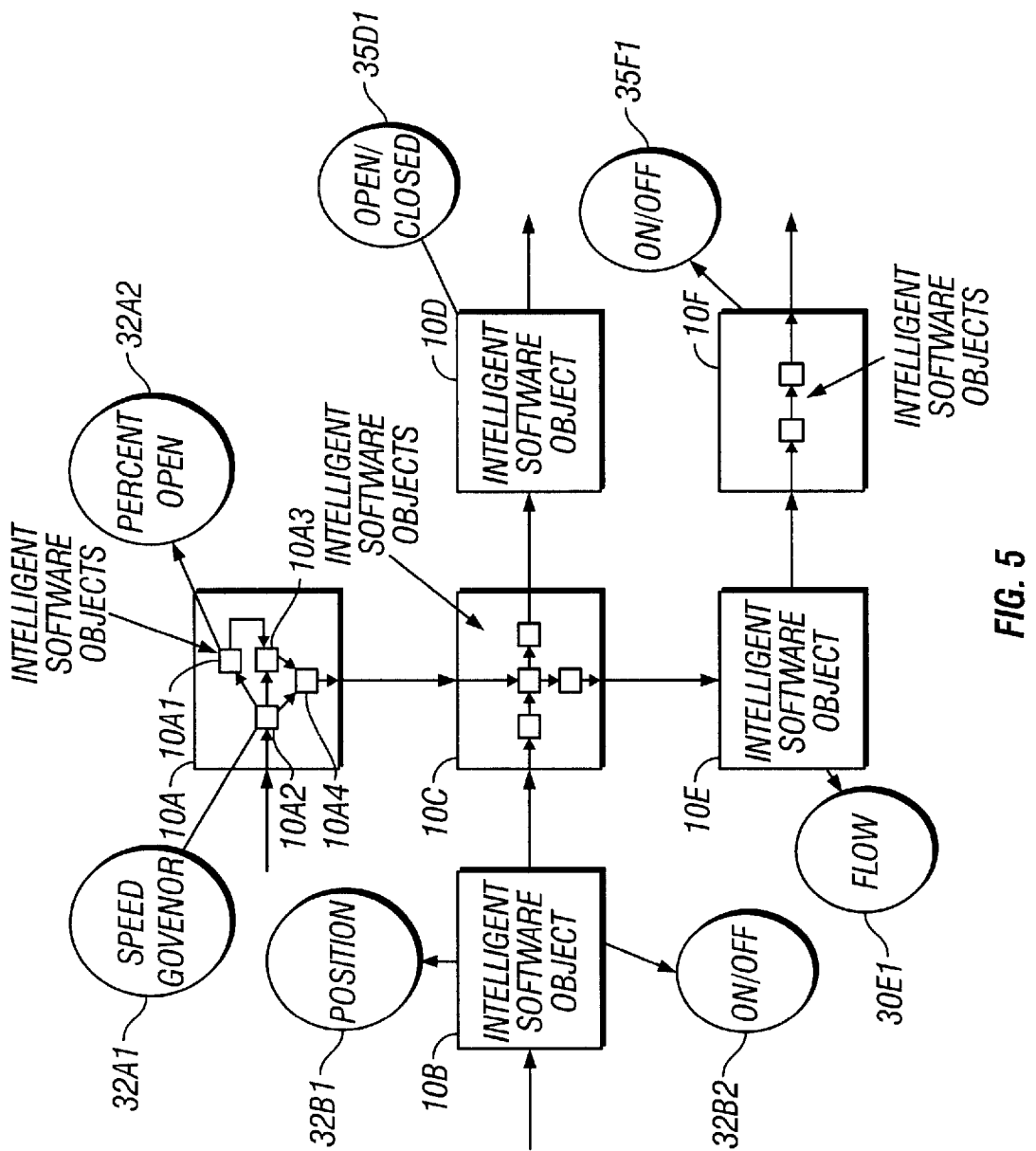
FIG. 5 is another block diagram illustrating ISOs connected to real-world control devices in accordance with the present invention.

Referring to FIG. 5, ISOs 10A through 10F are in communication with real-world control devices 32 and real-world actuators 35 to illustrate the concepts of control actions. For example, through its communications translator objects 26 and using its sensor objects 25, expert system objects 12, rules knowledge bases 13, predictor objects 18, adaptive models objects 20, and optimizer objects 22, ISO 10A sends state values to ISO 10C. ISO 10A1 sends a control command regulating speed to real-world control device 32A1 through one of ISO 10A1 's communication translator objects 26.

Figure 6:
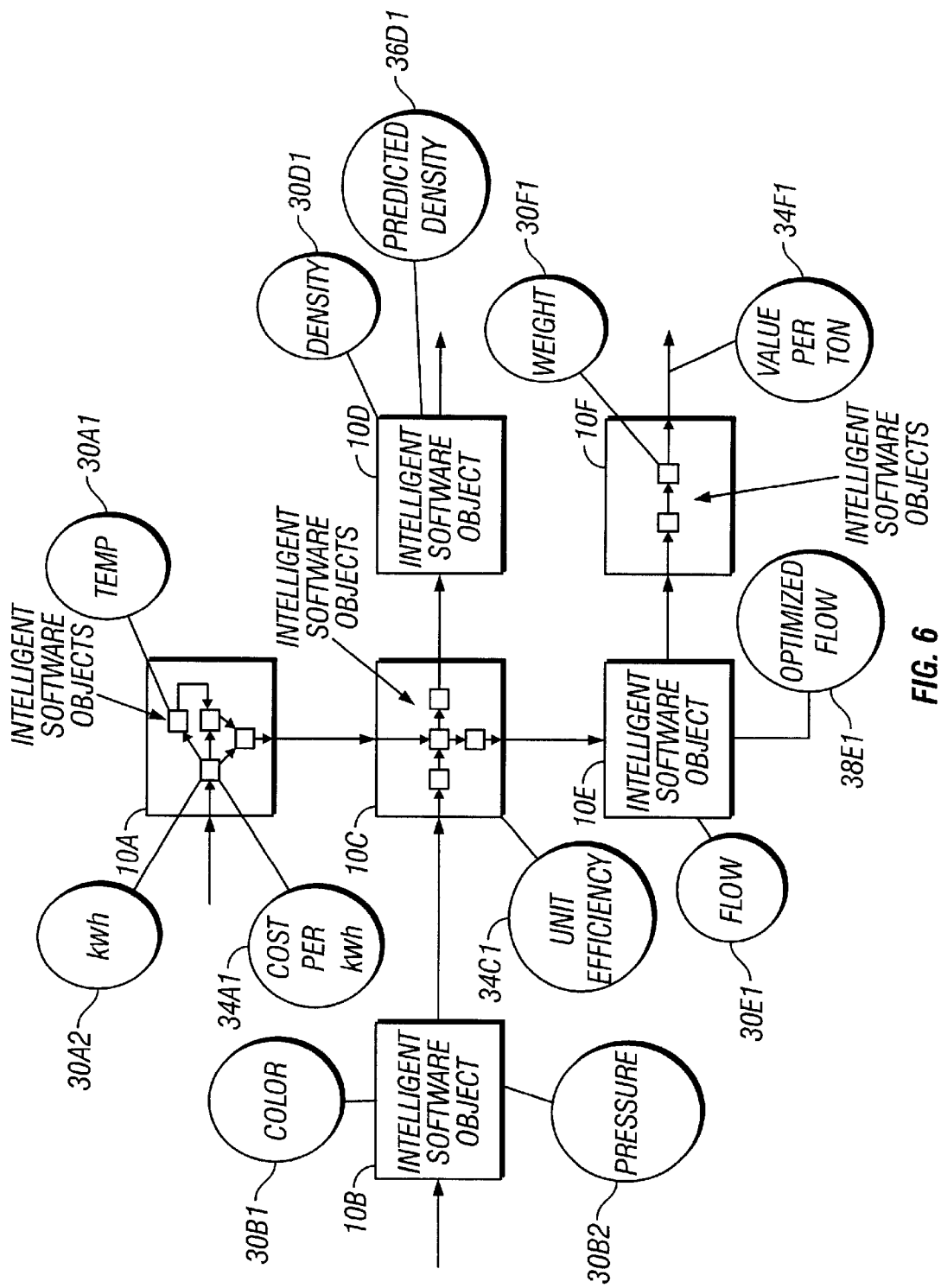
FIG. 6 is a block diagram illustrating ISOs connected to real-world devices, calculated, economic, predictor and optimizer based state variables in accordance with the present invention.

Referring to FIG. 6, an adaptive process control optimization system 1 is exemplified. ISO 10A is in communication with real-world instrumentation 30A1, real-world instrumentation 30A2, and economic state variable 34A1; ISO 10B is in communication with real-world instrumentation 30B1 and real-world instrumentation 30B2; ISO 10C is in communication with economic state variable 34C1; ISO 10D is in communication with real-world instrumentation 30D1 and has a predicted state variable 36D1; ISO 10E is in communication with real-world instrumentation 30E1 and has an optimizer state variable 38E1; and ISO 10F is in communication with real-world instrumentation 30F1 and has economic state variable 34F1.

Figure 7:
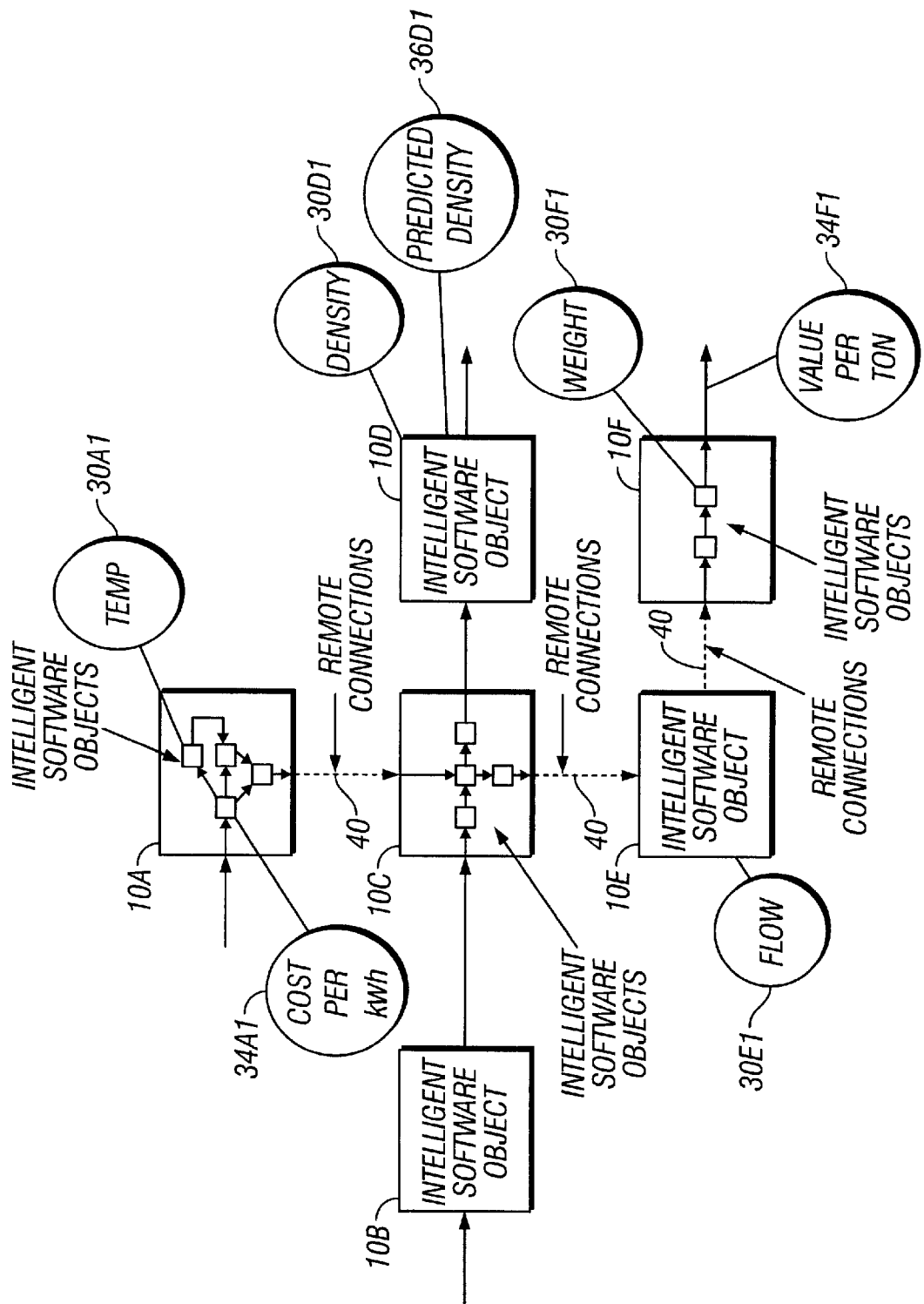
FIG. 7 is a block diagram illustrating ISOs connected to each other through remote connections in accordance with the present invention.

Referring to FIG. 7, a plurality of ISOs 10 are in communication with one another (for communication with each other) through remote connections 40. Remote connections 40 are made in many ways, including but not limited to, RF techniques, modems, satellite, wires, fiber optics, telemetry, and local or wide area networks.

Figure 8:
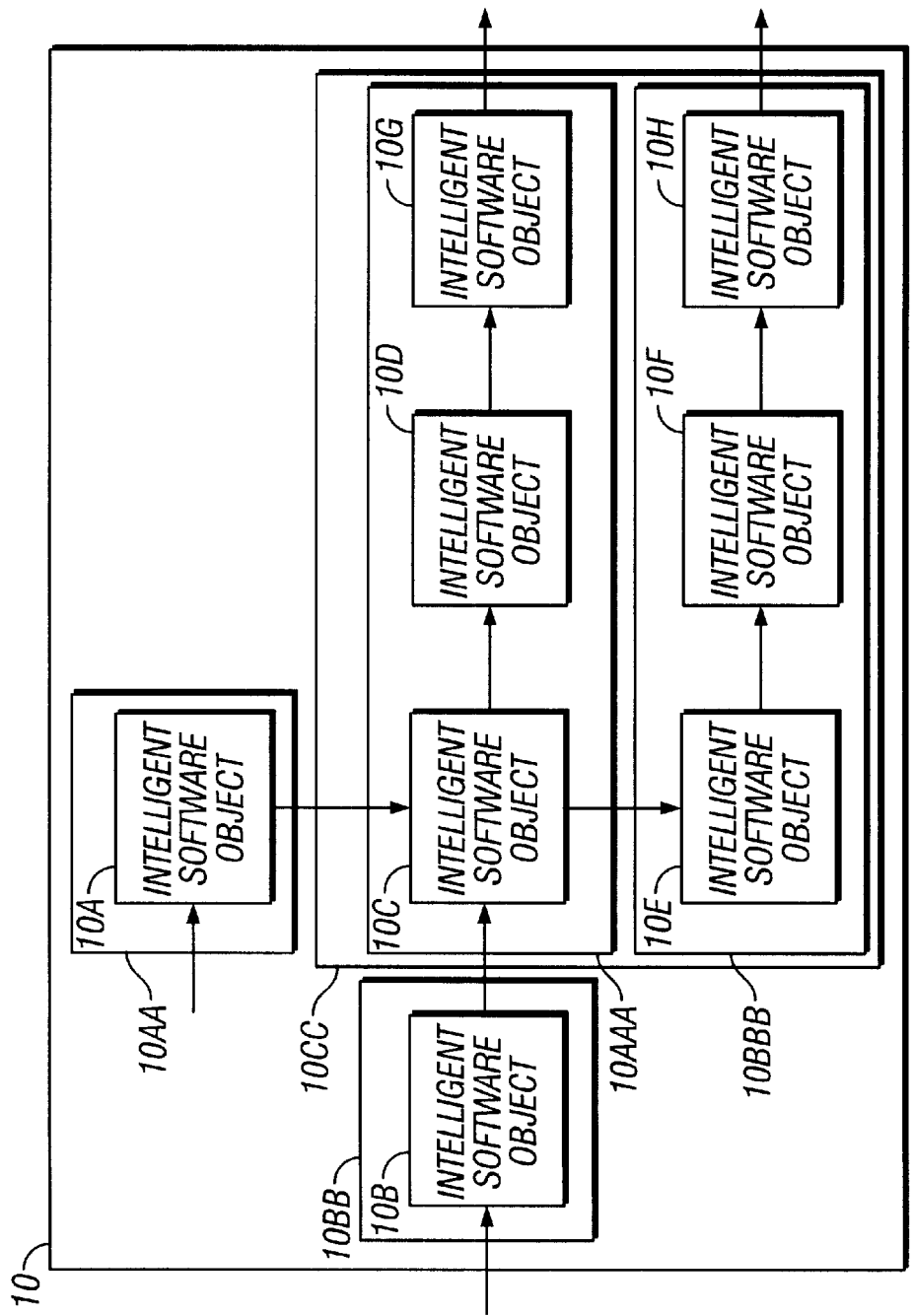
FIG. 8 is a block diagram illustrating the flow between ISOs organized in a hierarchy in accordance with the present invention.

Referring to FIG. 8, a plurality of ISOs 10 are connected in a hierarchy. ISO 10 contains other hierarchy ISOs 10, e.g. ISO 10AA, ISO 10BB, and ISO 10CC. Hierarchy ISO 10AA contains ISO 10A; hierarchy ISO 10BB contains ISO 10B; and hierarchy ISO CC contains hierarchy ISO 10AAA and hierarchy ISO BBB. Further, hierarchy ISO AAA contains ISO 10C, ISO 10D, and ISO 10G; hierarchy ISO BBB contains ISO 10E, ISO 10F, and ISO 10H. When ISOs 10 are arranged in this manner, they may represent abstract concepts such as a company, plant or plant area that is made up of ISOs 10 that are hierarchically contained within the group.

A description of an ISO's 10 specific internal software objects and their interaction with other internal software objects as well as with other ISOs 10 and real-world devices 100 will now be described.

Figure 9:
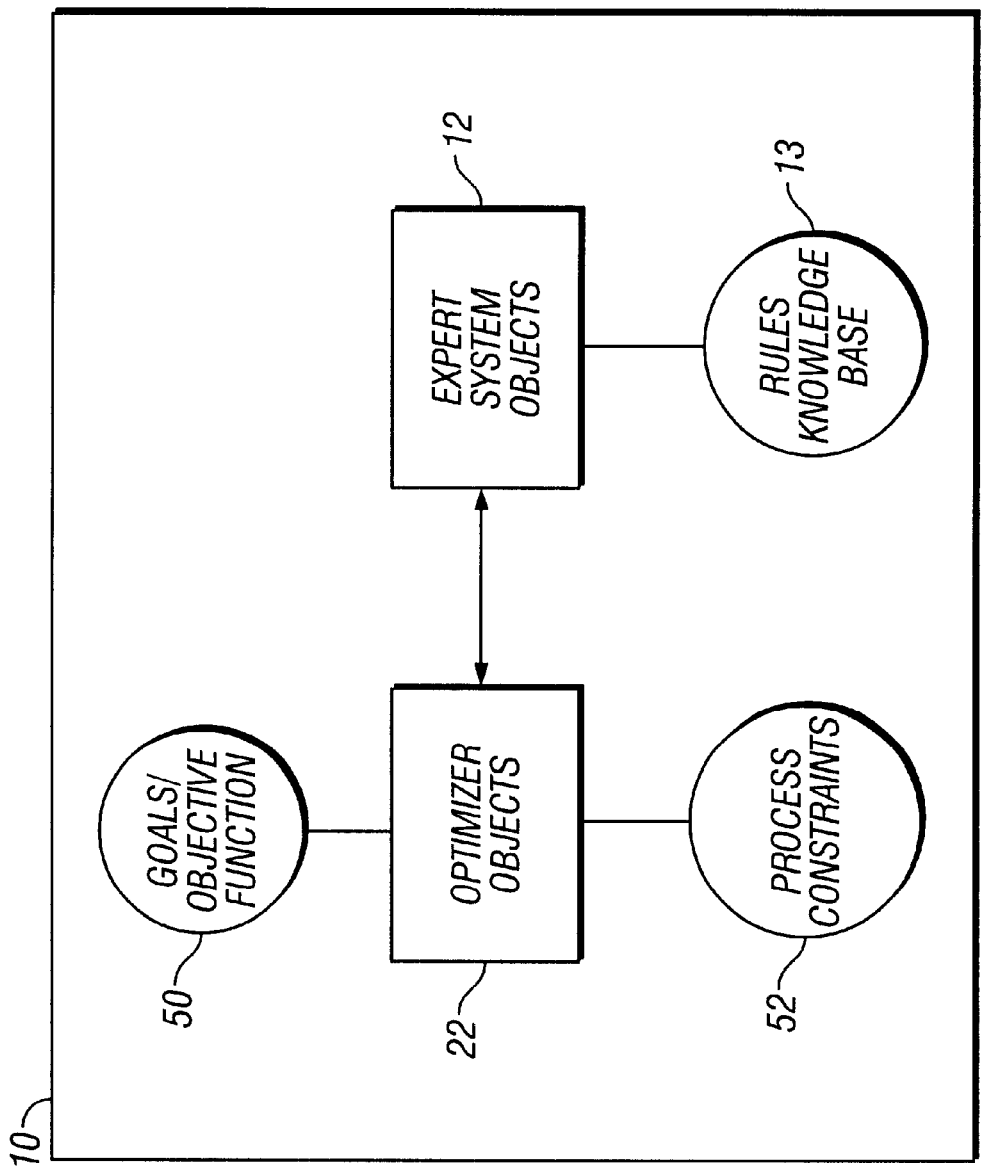
FIG. 9 is a block diagram illustrating how optimizer objects and expert system objects interact.

FIG. 9 illustrates a preferred embodiment in which optimizer objects 22 and expert system objects 12 interact within ISO 10. Expert system objects 12 are capable of utilizing one or more rules knowledge bases 13 holding linguistic rules providing behavior and control strategies for achieving the goals and objectives, and business logic appropriate for ISO 10. Using crisp logic rules 14 and/or fuzzy logic rules 16 contained in rules knowledge bases 13, expert system objects 12 can modify optimizer objects 22 by changing optimizer object's 22 goals and objective functions 50 definitions or configuration in relationship to process constraints 52. For example, expert system object 12 may be configured with a rules knowledge base 13 containing crisp rules 14 and/or fuzzy rules 16 that modify an optimizer object's 22 goals and objective functions 50 based on the availability of raw feed material associated with ISO's 10 process.

Figure 10:
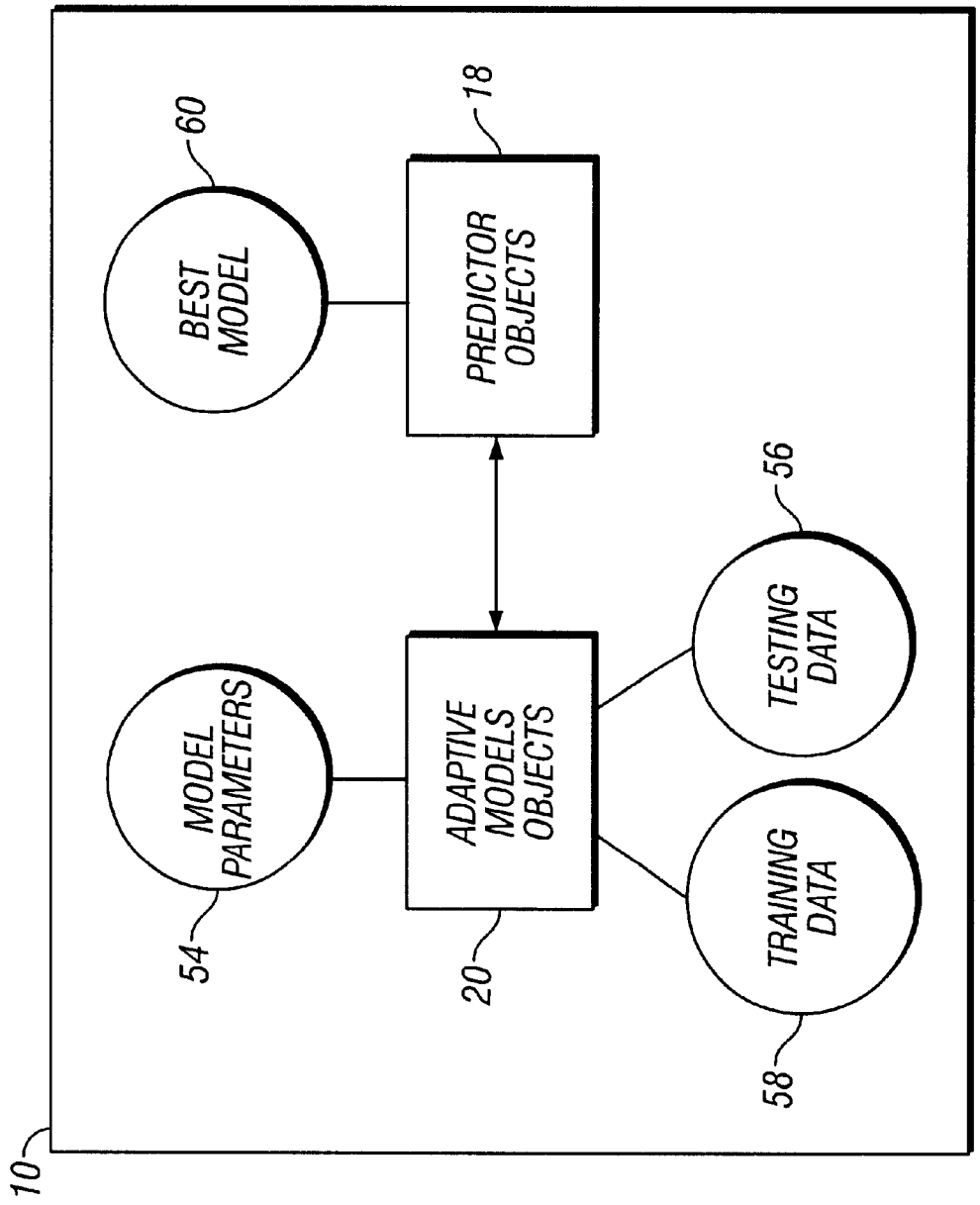
FIG. 10 is a block diagram illustrating how adaptive model objects and predictor objects interact.

FIG. 10 illustrates how adaptive model objects 20 and predictor objects 18 interact. Predictor objects 18 provide ISO 10 with an adaptive model of the process to be controlled, best model 60 that ISO 10 represents along with the data of that adaptive model. Comparing each current adaptive model's actual prediction of the process to the response, predictor object 18 identifies which one of all of its adaptive models is predicting most accurately; that adaptive model is then identified as the predictor object's 18 best model 60.

Figure 11:
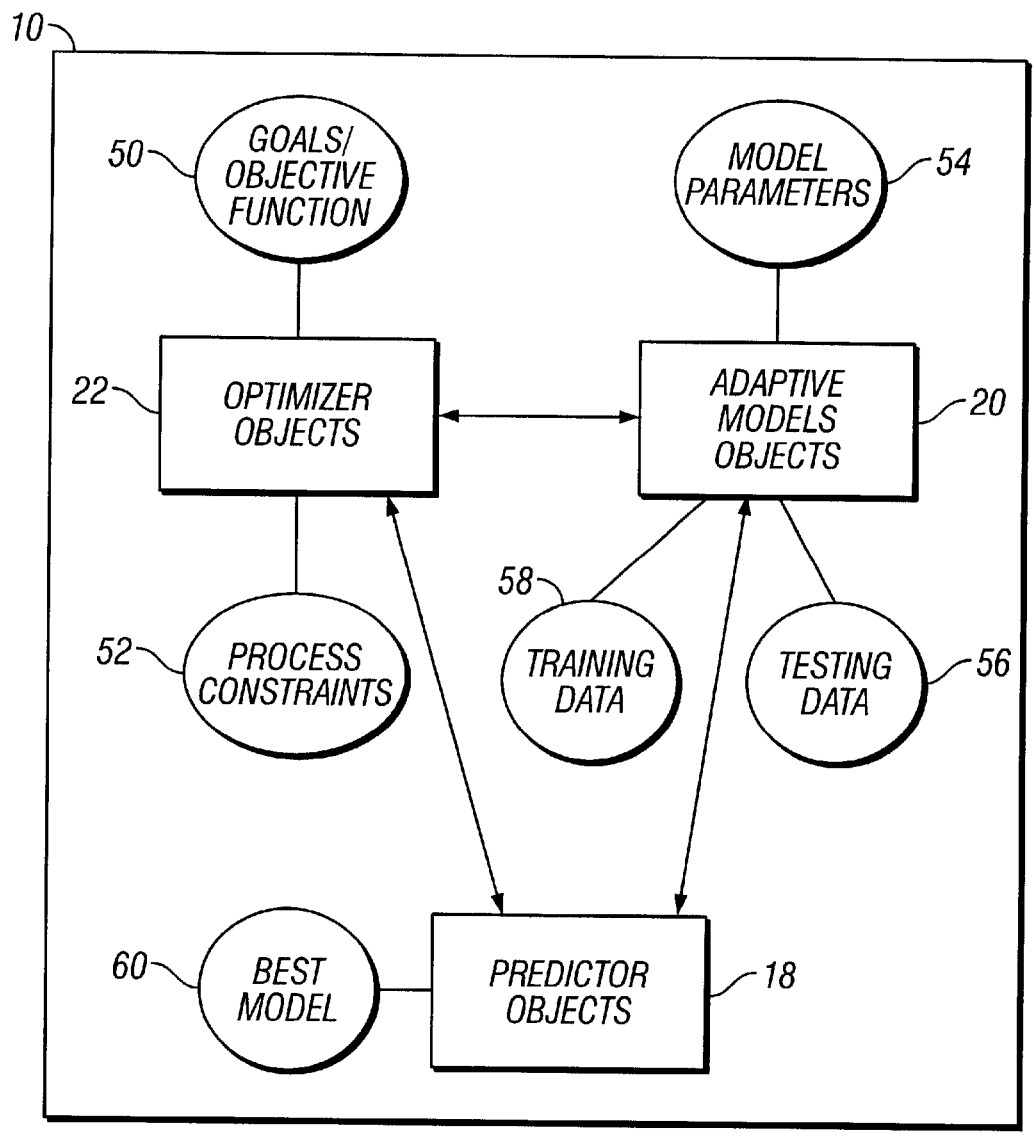
FIG. 11 is a block diagram illustrating how optimizer objects and adaptive model objects interact.

FIG. 11 illustrates how optimizer objects 22 and adaptive model objects 20 interact. Optimizer object 22 is configured with goals and objective functions 50 appropriate for ISO 10 within an adaptive process control optimization system 1. Optimizer object 22 can be configured with process constraints 52 that identify limitations in the process to be controlled that optimizer object 22 should not violate when working to achieve ISO's 10 specified goals and objective functions 50. Optionally, process constraints may be calculated. FIG. 11 further illustrates how optimizer objects 22 and predictor objects 18 interact. Optimizer objects 22 determine the conditions which best achieve optimizer object's 22 goals and objective functions 50 by using predictor object 18 and predictor object's 18 best model 60 to predict the future performance of the process ISO 10 represents based on the conditions that optimizer object 22 supplies to the predictor object 18. Optimizer object 22 finds the conditions which best achieve its goals and objective functions 50 without violating process constraints 52 by using adaptive models objects 20 to simulate, calculate, or predict future performance of the process. Optimizer object 22 knows which adaptive models objects 20 to use by consulting predictor object 18 to find predictor object's 18 best model 60. The optimization process proceeds iteratively as optimizer object 22 selects trial conditions that are possible solutions to achieving optimizer object's 22 goals and objective functions 50, then passing these trial conditions to adaptive models object 20. Adaptive models object 20 simulates the process to be controlled using optimizer object's 22 conditions, returning adaptive models object's 20 results to optimizer object 22 which then determines whether these results achieve optimizer object's 22 desired goals and objective functions 50 without violating optimizer object's 22 process constraints 52. If so, optimizer object 22 retains the results; if not, optimizer object 22 attempts a new set of trial conditions.

Figure 12:
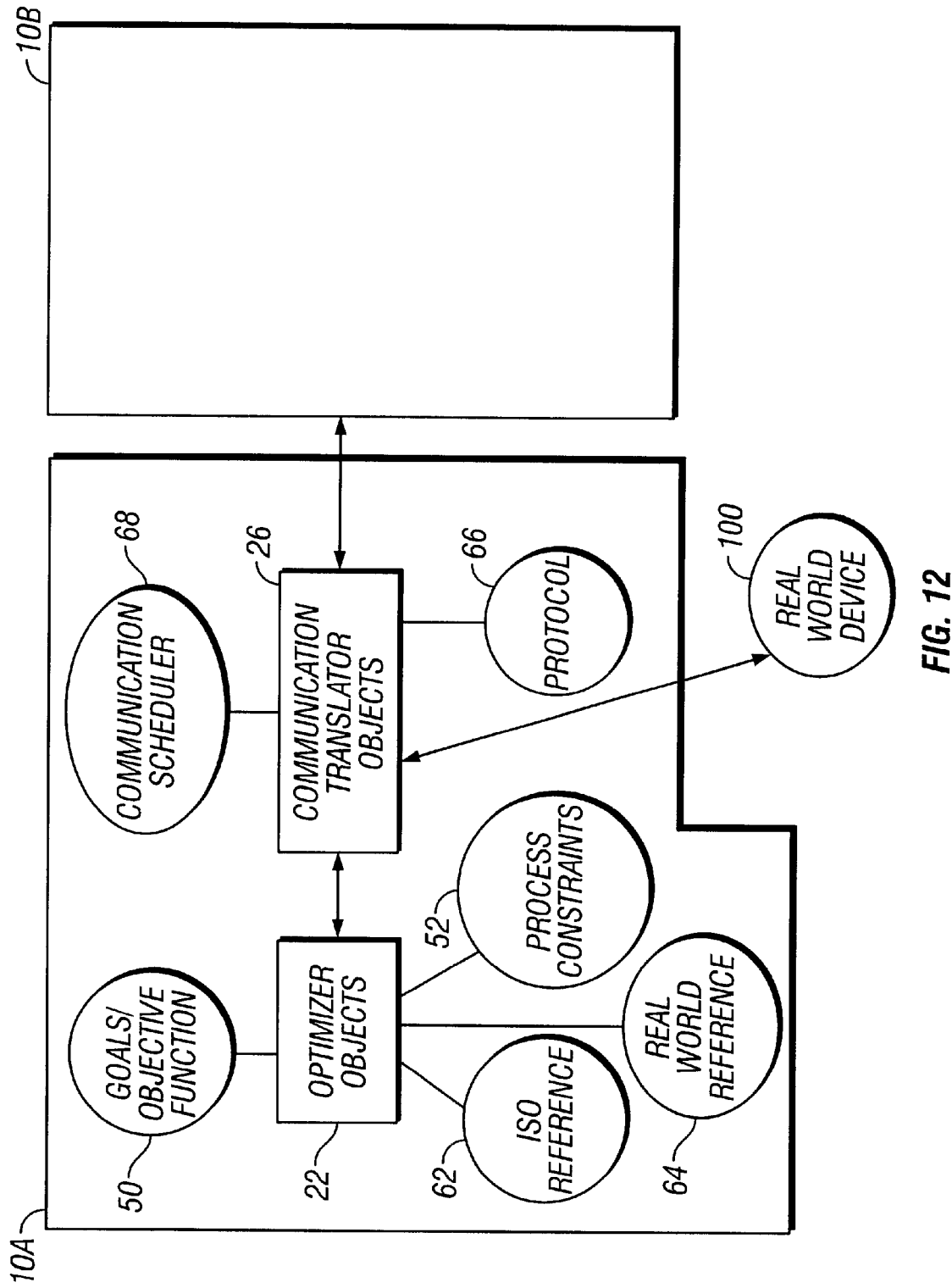
FIG. 12 is a block diagram illustrating how optimizer objects and communication translator objects interact.

FIG. 12 illustrates how optimizer objects 22 and communication translator objects 26 interact to send or receive data from ISO 10A to ISO 10B or from ISO 10A to real-world device 100; as used in FIG. Nos. 12 through 22, real-world device 100 can include real-world instrumentation 30, real-world control devices 32, real-world actuators 35 as well as from a real-world DCS 2. ISO's 10A optimizer object 22 provides one of ISO's 10A communication translator objects 26 with ISO reference 62 identifying ISO 10B with which ISO 10A wishes to communicate; communication translator object 26 stores ISO reference 62 and schedules requests to retrieve the data from ISO 10B. Further, communication translator object 26 creates the request for data from ISO 10B using a protocol 66 appropriate to ISO 10B of which ISO 10A is aware. At an appropriate sampling delta, communication translator object 26 probes ISO 10B, retrieving data from ISO 10B and passing the data to optimizer object 22. Data can be retrieved from ISO 10B through communicator translator 26 when optimizer object 22 requests data from ISO 10B by optimizer object 22 issuing a request-data command to communicator translator 26, or communicated to ISO 10B when optimizer object 22 passes the data to communication translator object 26 using a transmit-data command.

As also shown in FIG. 12, ISO's 10A optimizer object 22 can request data from or provide data to real-world device 100 by providing one of ISO's 10A communication translator objects 26 with real-world reference 64 identifying real-world device 100; communication translator object 26 stores real-world reference 64 and schedules requests to retrieve the data from or communicate data to real-world device 100 using a protocol 66 appropriate to real-world device 100 of which ISO 10A is aware. At an appropriate sampling delta, communication translator object 26 probes real-world device 100, retrieving data from real-world device 100 and passing the data to optimizer object 22. Data can be retrieved from real-world device 100 through communication translator 26 when optimizer object 22 requests data from real-world device 100 by optimizer object 22 issuing a request-data command to communicator translator 26, or communicated to real-world device 100 when optimizer object 22 passes the data to communication translator object 26 using a transmit-data command.

In either case, optimizer objects 22 can make asynchronous requests to read or write data on demand when necessary.

Figure 13:
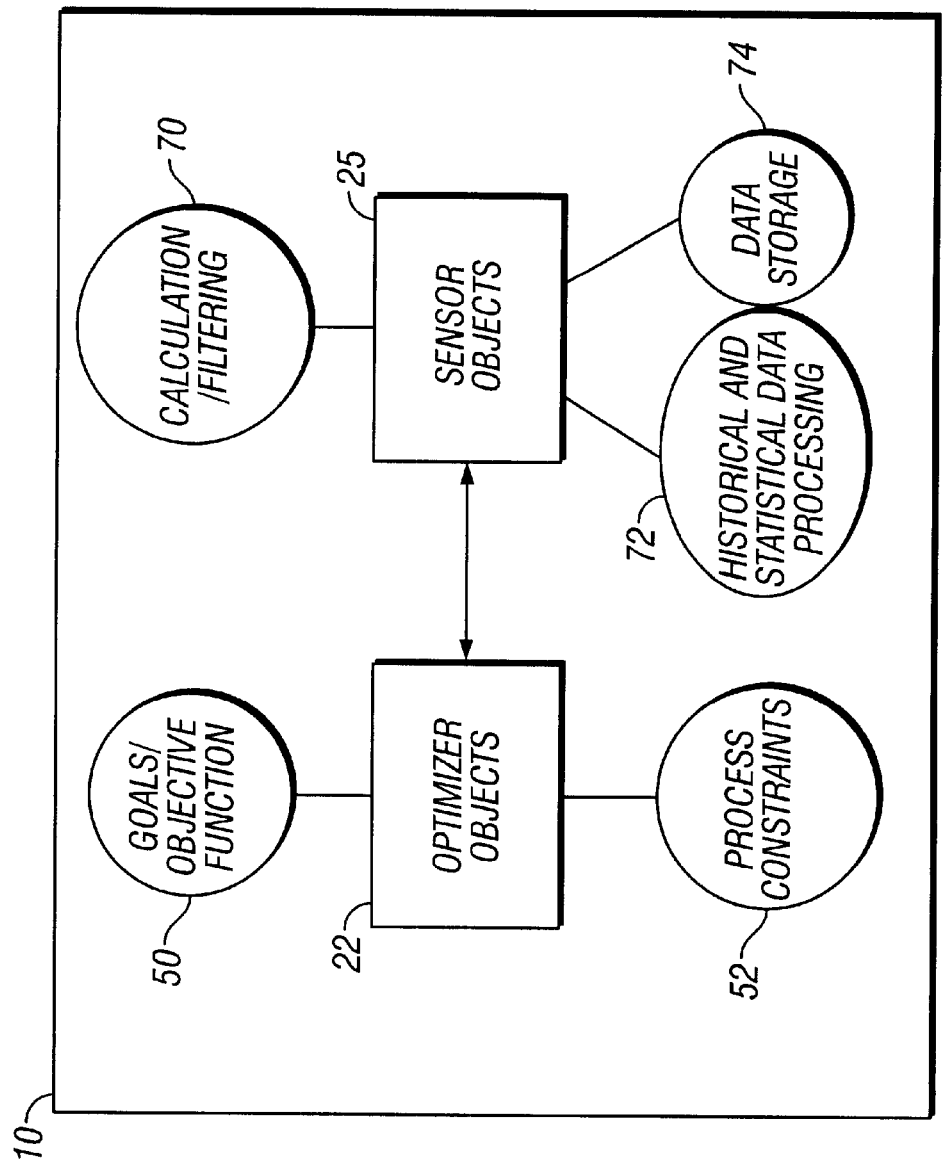
FIG. 13 is a block diagram illustrating how optimizer objects and sensor objects interact.

FIG. 13 illustrates how optimizer objects 22 and sensor objects 25 interact. Optimizer objects 22 use any combination of sensor objects' 25 current data in data storage 74 or historical and/or statistical data in historical and statistical data processing 72 to evaluate optimizer object's 22 goals and objective functions 50, and process constraints 52 to perform optimizer object's 22 optimization. Optionally, the sensor object 25 applies the appropriate calculation and filtering 70 methodologies and stores the result in data storage 74.

Figure 14:
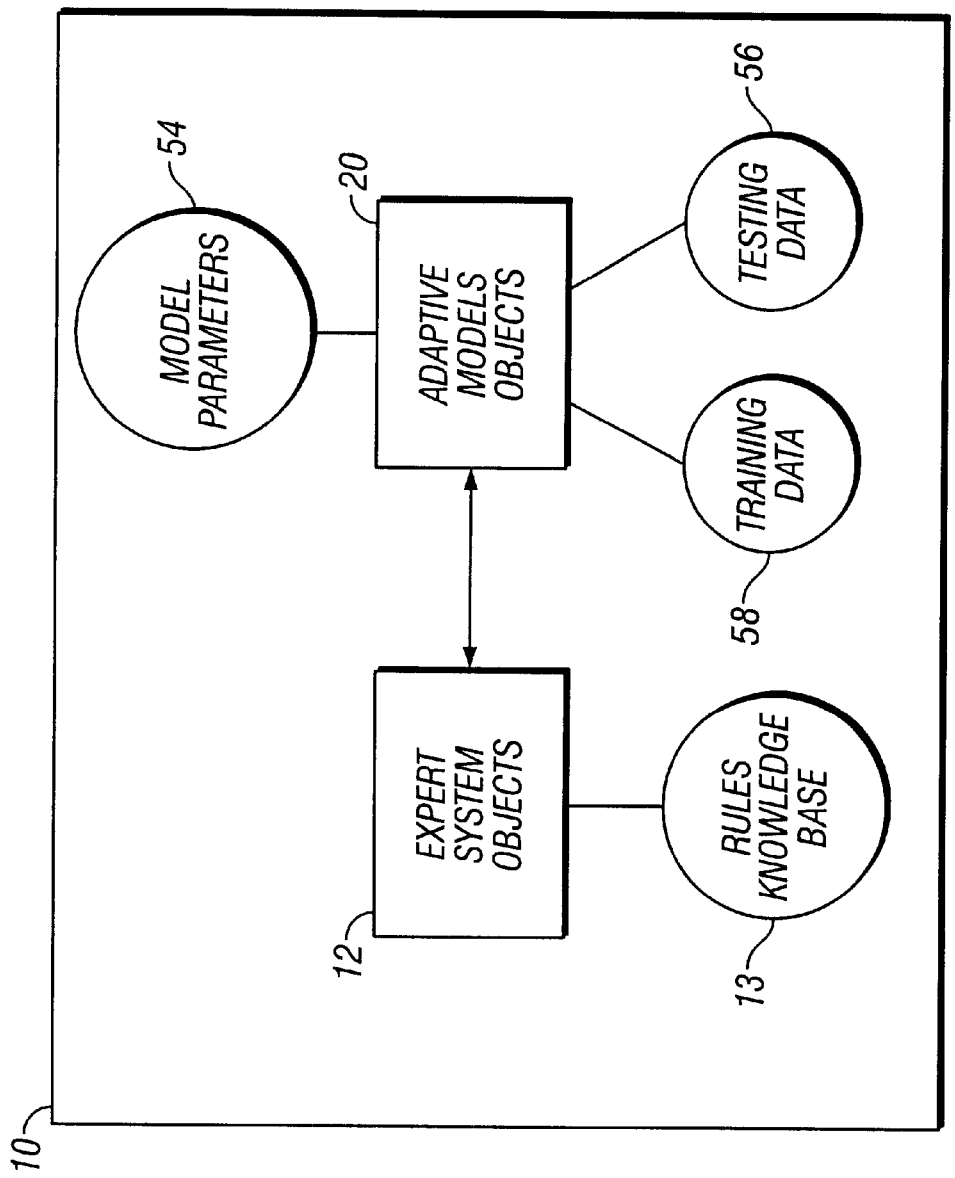
FIG. 14 is a block diagram illustrating how expert system objects and adaptive model objects interact.

FIG. 14 illustrates how expert system objects 12 and adaptive model objects 20 interact. Expert system objects 12 are capable of utilizing one or more rules knowledge bases 13 and can use the rules contained in rules knowledge bases 13 to adaptively change adaptive models object's 20 performance or configuration. For example, depending on some configurable or arbitrary condition, adaptive models object 20 may need to stop sampling for new training data 58 or testing data 56. A rule in expert system object's 12 rules knowledge bases 13 could be configured to accomplish this action. Additionally, expert system object's 12 rules knowledge bases 13 may contain a rule that stops the training process altogether depending on the values of the model parameter or training error.

Figure 15:
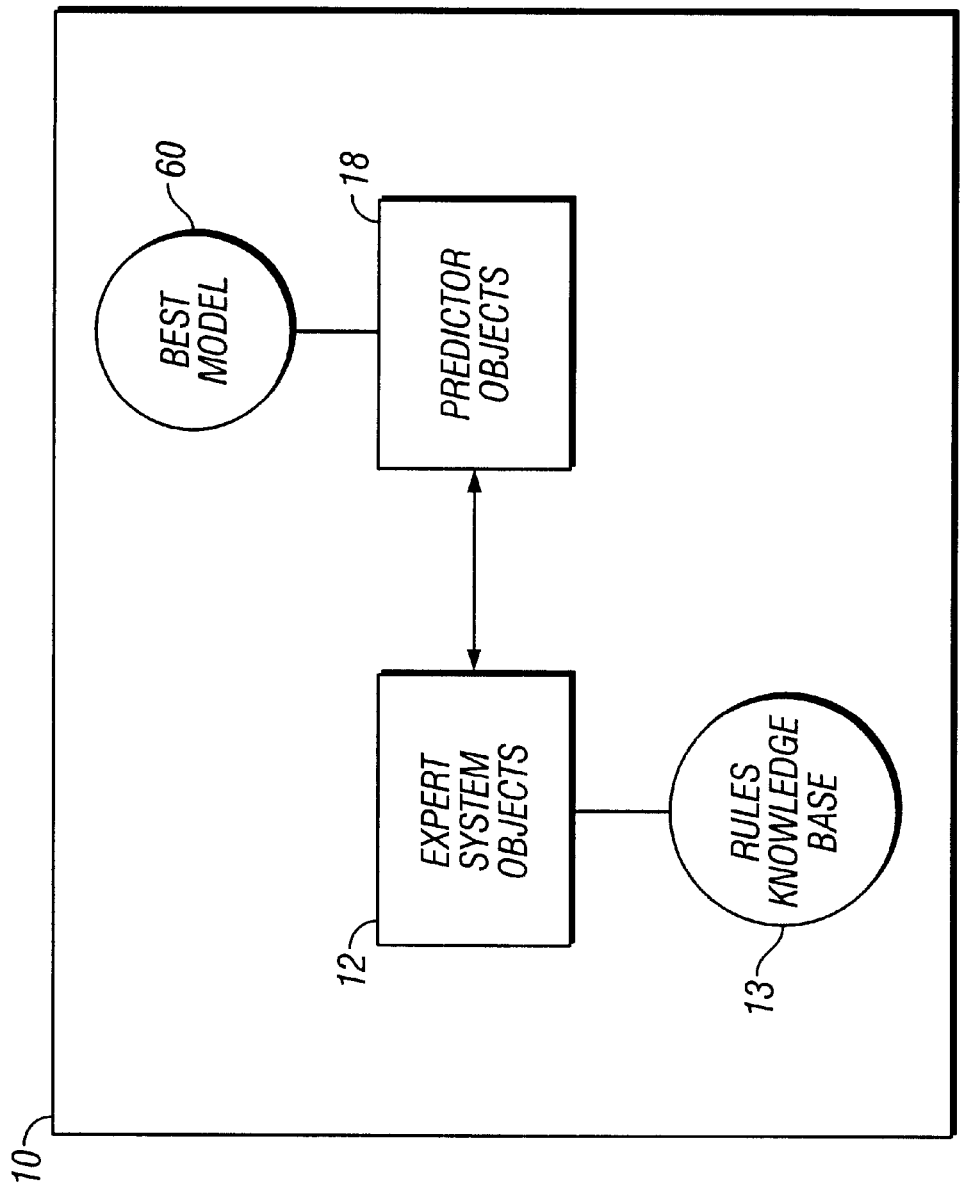
FIG. 15 is a block diagram illustrating how expert system objects and predictor objects interact.

FIG. 15 illustrates how expert system objects 12 and predictor objects 18 interact. Expert system objects 12 can use the rules contained in rules knowledge bases 13 to adaptively change predictor objects' 18 performance or configuration. For example, expert system object 12 may contain rules that cause predictor object 18 to generate a new adaptive model when the best model 60 does not accurately describe the process to be controlled.

Figure 16:
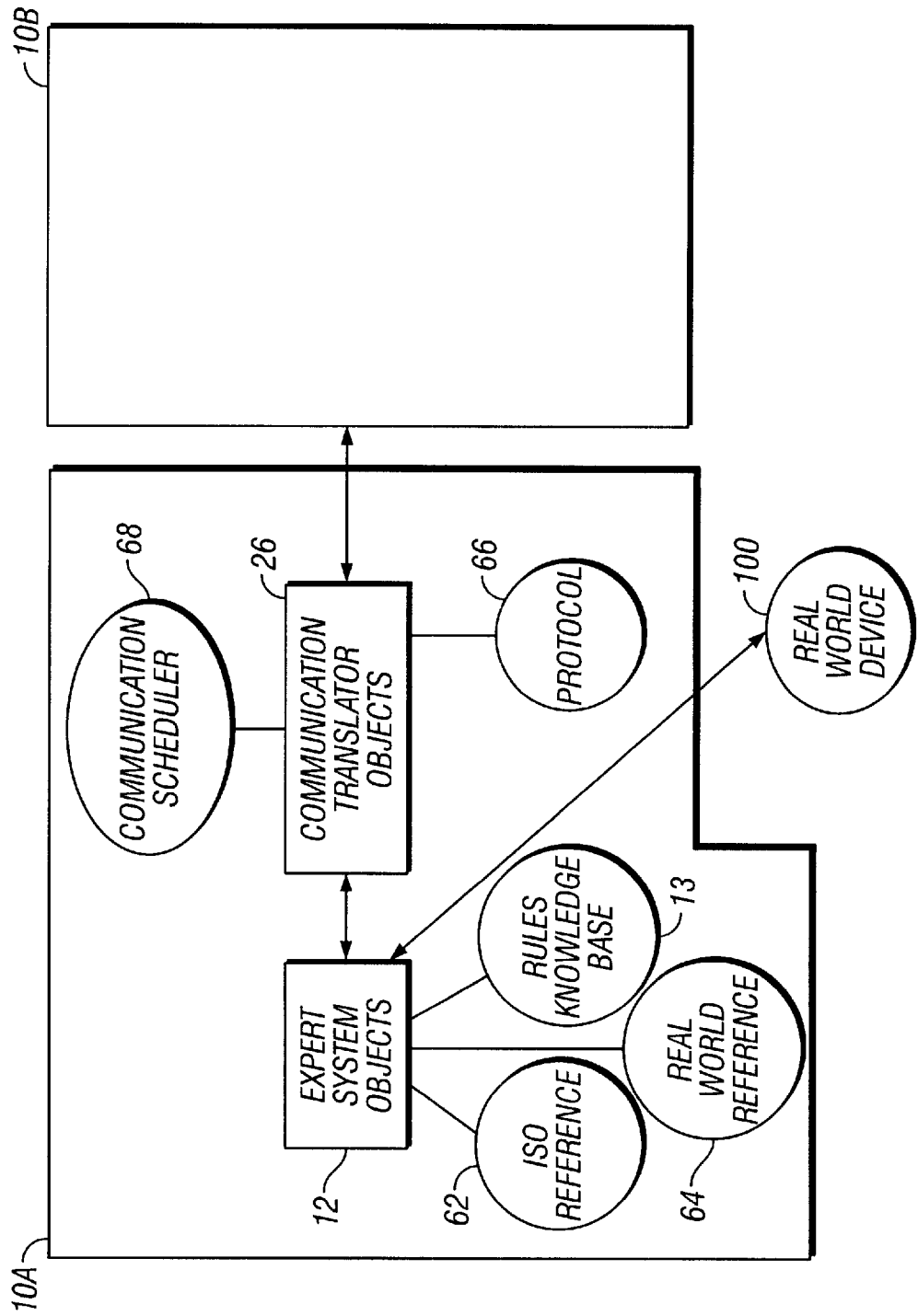
FIG. 16 is a block diagram illustrating how expert system objects and communicator translator objects interact.

FIG. 16 illustrates how expert system objects 12 and communication translator objects 26 interact. Expert system objects 12 provide communication translator objects 26 with ISO reference 62 identifying ISO 10B or real-world reference 64 identifying real-world device 100 with which ISO 10A wishes to communicate. Communication translator object 26 stores the appropriate reference and schedules requests to retrieve the data from ISO 10B or real-world device 100. Communication translator object 26 creates the request based upon communication scheduler 68 for data from ISO 10B or real-world device 100 using a protocol 66 appropriate to ISO 10B or real-world device 100. Expert system objects 12 request data from ISO 10B or real-world device 100 by issuing a request-data command to communication translator object 26. At an appropriate sampling delta, communication translator object 26 probes either ISO 10B or real-world device 100 as appropriate, retrieving the data and passing the data to expert system object 12. To transmit data to ISO 10B or real-world device 100, expert system object 12 passes the data to be communicated to communication translator object 26, using a transmit-data command. Expert system object 12 can make asynchronous requests to read or write data on demand when necessary.

Figure 17:
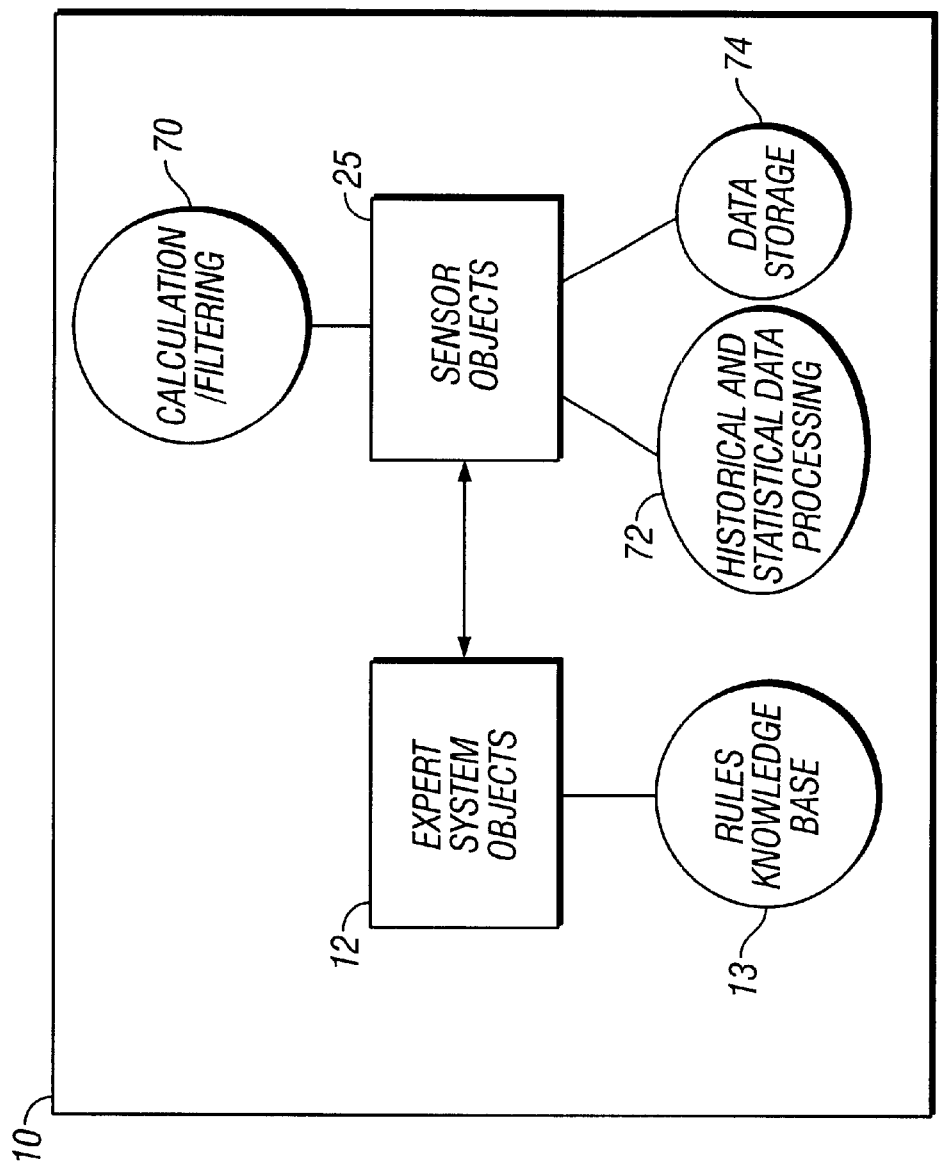
FIG. 17 is a block diagram illustrating how expert system objects and sensor objects interact.

FIG. 17 illustrates how expert system objects 12 and sensor objects 25 interact. Expert system objects 12 can use the rules contained in rules knowledge bases 13 to act on any combination of sensor object's 25 current data in data storage 74 or historical and/or statistical data in historical and statistical data processing 72.

Figure 18:
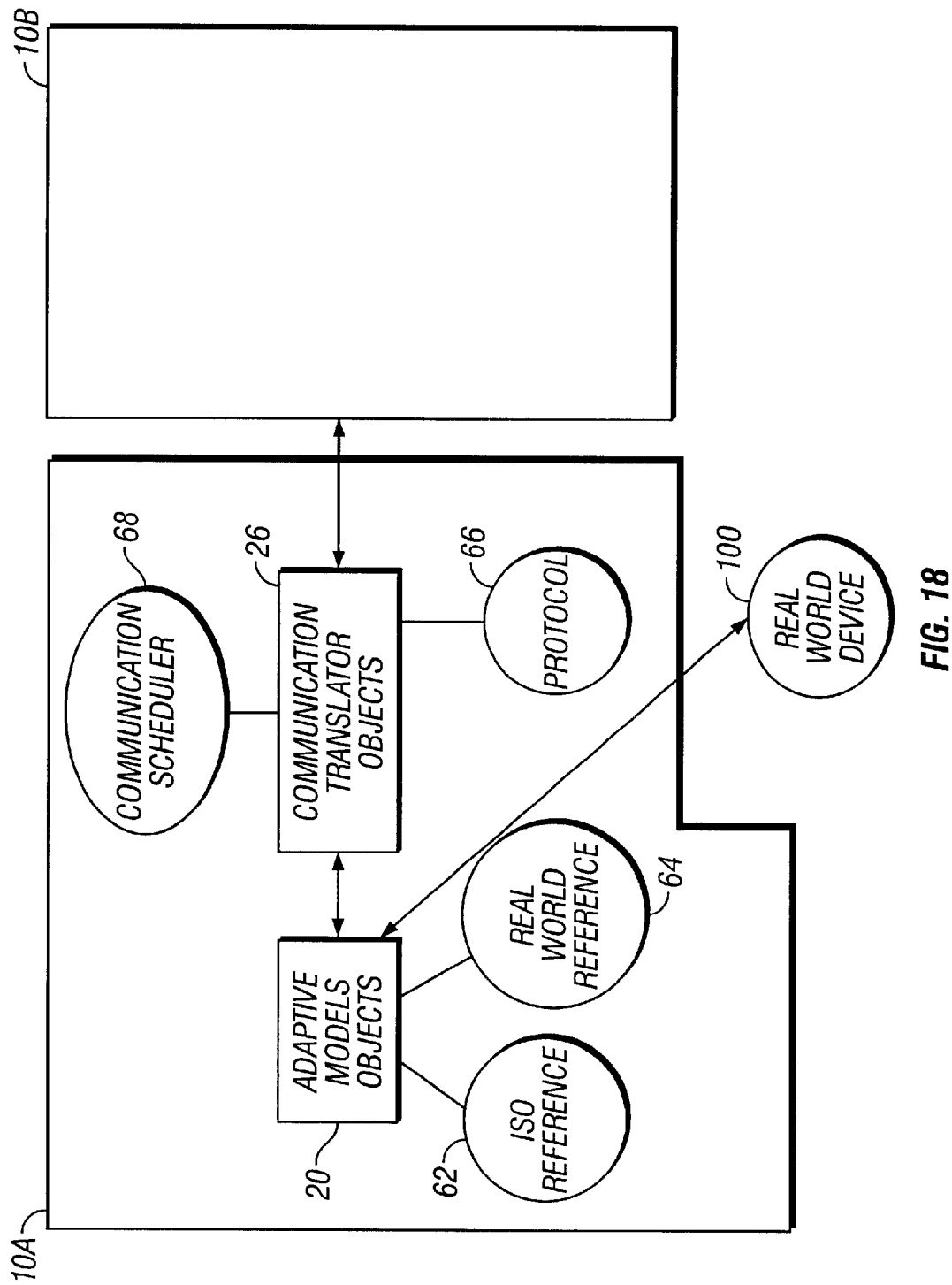
FIG. 18 is a block diagram illustrating how adaptive model objects and communicator translator objects interact.

FIG. 18 illustrates how adaptive model object 20 and communication translator objects 26 interact. Adaptive models object 20 provides communication translator object 26 with ISO reference 62 or real-world reference 64 identifying ISO 10B or real-world device 100 with which ISO 10A wishes to communicate. Communication translator object 26 stores the appropriate reference and schedules requests using communication scheduler 68 to retrieve the data from either ISO 10B or real-world device 100 as requested, creating the request for data from ISO 10B or real-world device 100 using a protocol 66 appropriate to ISO 10B or real-world device 100. At the appropriate sampling delta, communication translator object 26 probes ISO 10B or real-world device 100, retrieving the data and passing the data to the requesting adaptive models object 20. To transmit data to ISO 10B or real-world device 100, adaptive models object 20 passes that data to communication translator object 26 using a transmit-data command; adaptive models object 20 requests data from ISO 10B or real-world device 100 by issuing a request-data command. Asynchronous requests to read or write data on demand can be made by adaptive models object 20 when necessary.

Figure 19:
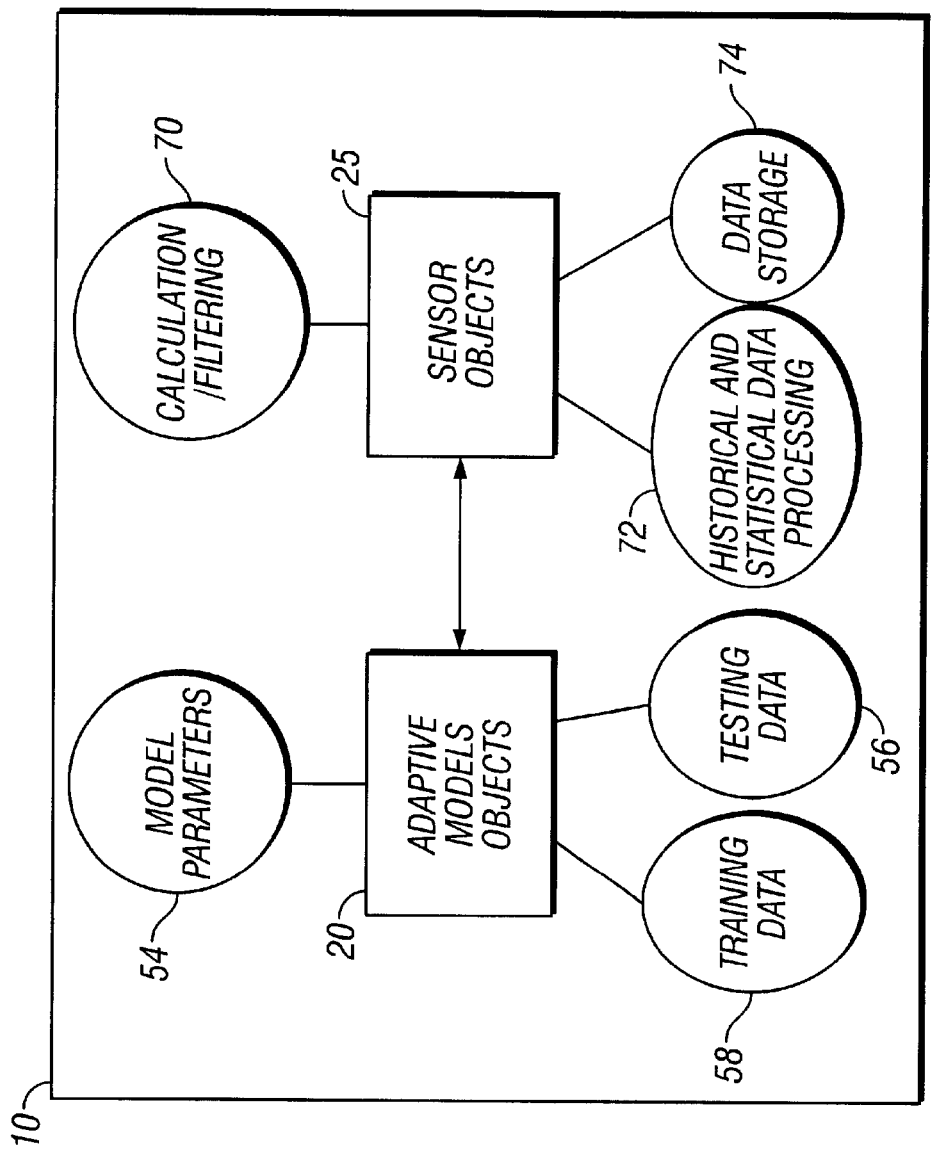
FIG. 19 is a block diagram illustrating how expert adaptive model and sensor objects interact.

FIG. 19 illustrates how adaptive model objects 20 and sensor objects 25 interact. Adaptive models objects 20 provide ISO 10 with the ability to describe, model and predict the process that ISO 10 and its sensor objects 25 represent. Adaptive models objects 20 create the data required to train its adaptive models and to learn how to control its associated process. Adaptive models object 20 stores the data for training in adaptive models object's 20 training data 58; further, adaptive models object 20 creates data required to test the accuracy of what adaptive models object 20 has learned, storing this data in adaptive models object's 20 testing data 56. To create the training data 58 and/or the testing data 56, adaptive models objects 20 consult one or more sensor objects 25 that comprise adaptive models object's 20 list of inputs, the inputs providing the data required to initialize adaptive models object 20 when simulating or predicting the process associated with adaptive models object 20. Adaptive models object 20 also consults one or more sensor objects 25 that comprise adaptive models object's 20 list of outputs, the outputs providing the data that adaptive models object 20 is to describe. An entry in training data 58 or test data 56 includes the inputs from a sampling interval delta together with the corresponding outputs. Optionally, training data 58 and/or the testing data 56 may be developed externally and input or loaded into adaptive model objects 20, for example, from external data histories.

Figure 20:
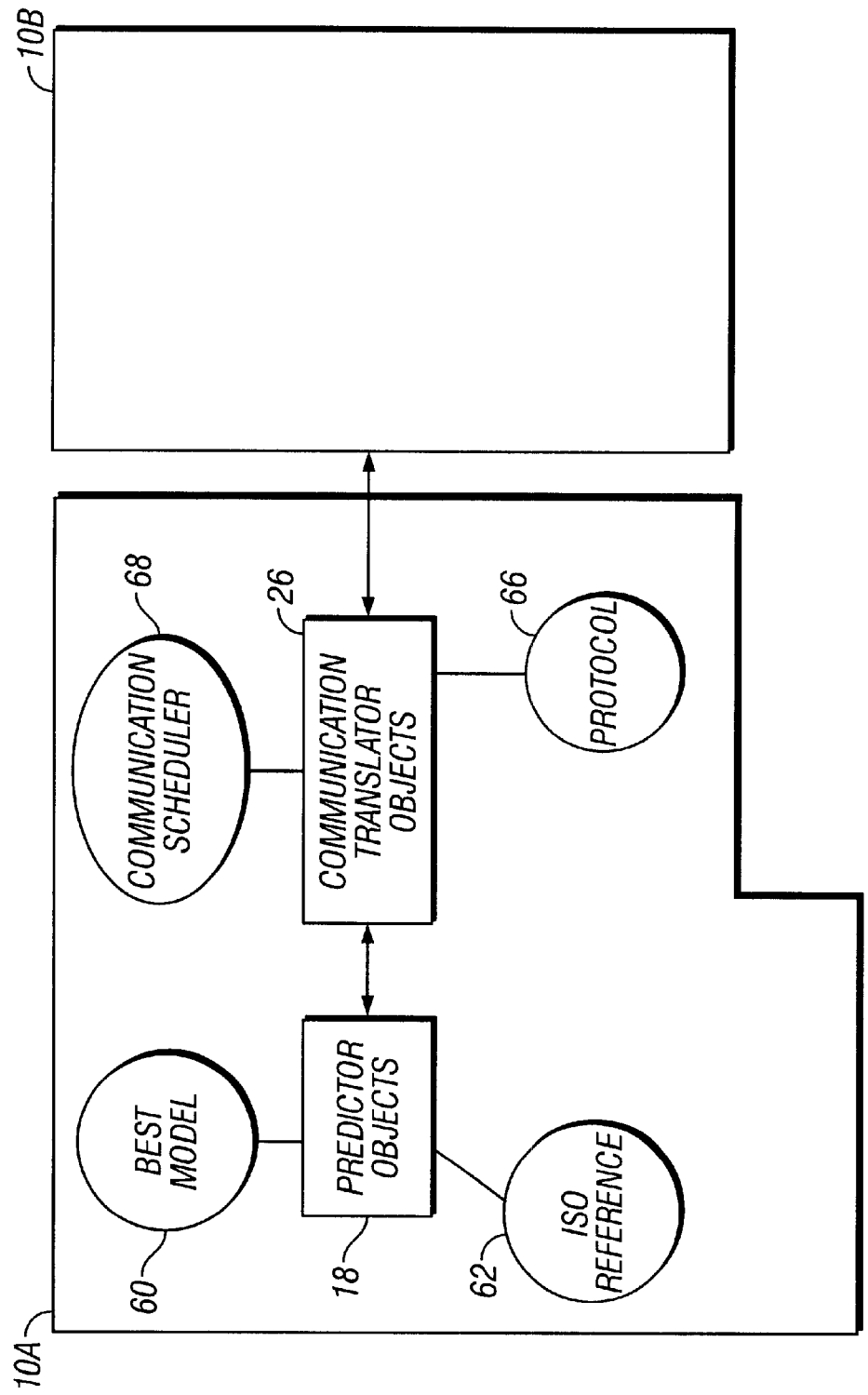
FIG. 20 is a block diagram illustrating how predictor objects and communicator translator objects interact.

FIG. 20 illustrates how predictor objects 18 and communication translator objects 26 interact. Predictor object 18 provides communication translator object 26 with ISO reference 62 identifying ISO 10B with which ISO 10A wishes to communicate. Communication translator object 26 stores ISO reference 62 and schedules requests using communication scheduler 68 to retrieve the data from ISO 10B, if necessary, creating the request for data from ISO 10B using a protocol 66 appropriate for ISO 10B of which ISO 10A is aware. At the appropriate sampling delta, communication translator object 26 probes ISO 10B, retrieving the data and passing the data to the requesting predictor object 18. To transmit data to ISO 10B, predictor object 18 passes that data to communication translator object 26 using a transmit-data command; predictor object 18 requests data from ISO 10B by issuing a request-data command. Asynchronous requests to read or write data on demand can be made by predictor object 18 when necessary.

Figure 21:
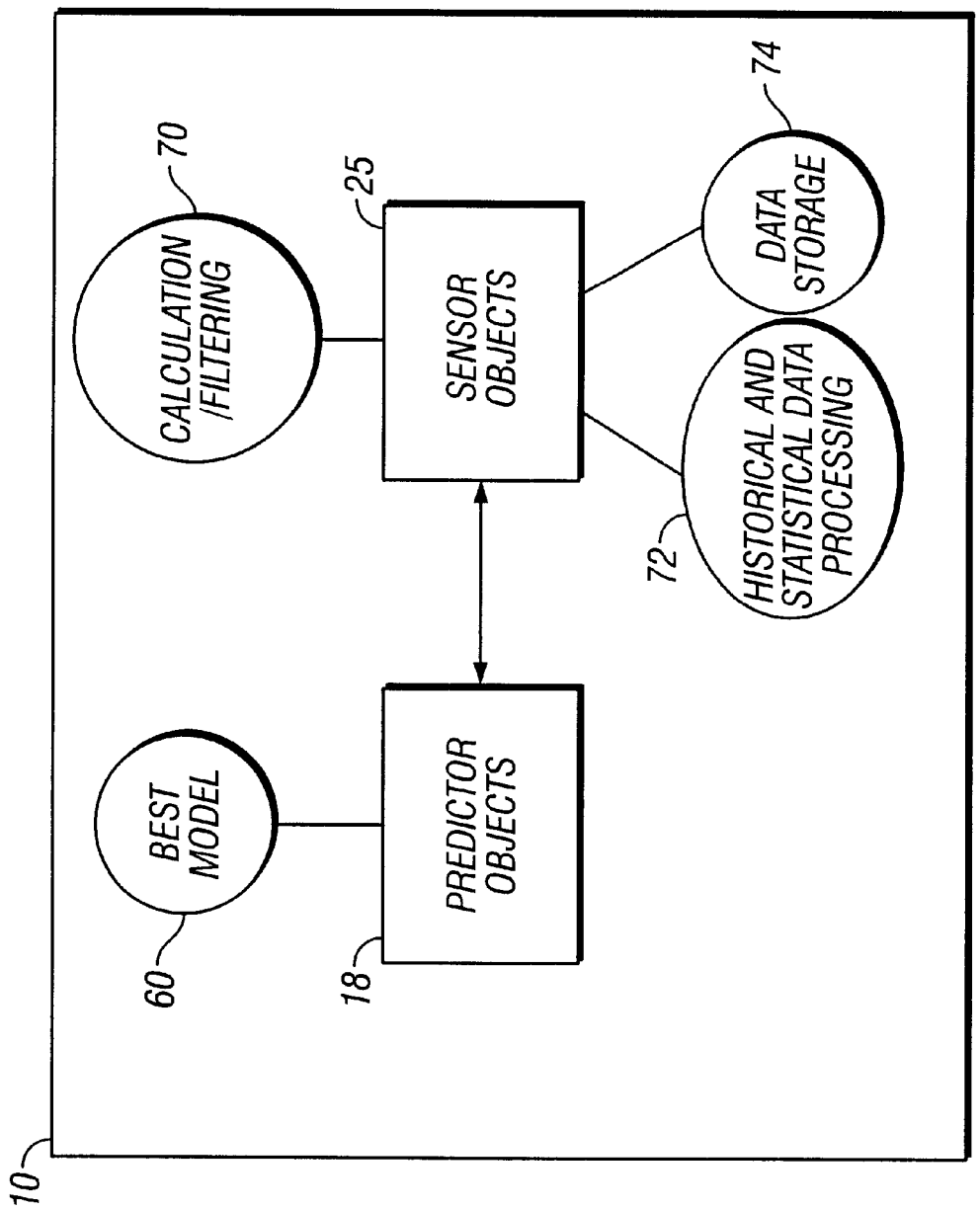
FIG. 21 is a block diagram illustrating how expert predictor and sensor objects interact.

FIG. 21 illustrates how predictor objects 18 and sensor objects 25 interact. Predictor objects 18 provide ISO 10 with adaptive models of the process that ISO 10 represents and the data of those adaptive models. Predictor object 18 can be associated with a one or more adaptive models objects 20, and identifies the best model 60 for that sampling delta, i.e. which one of all of the adaptive models objects 20 associated with predictor 18 that is currently predicting most accurately. Predictor object 18 can create sensor objects 25 that store data pertinent to selecting the best model 60 and as well as recording both the current best model's efficiency and predictor object's 18 efficiency. The difference between the current best model's efficiency and predictor object's 18 efficiency is that the current best model's efficiency relates to the performance of that model singularly, but predictor object's 18 efficiency cannot necessarily be attributed to only one model, reflecting and relating instead to the history of predictor object's 18 performance. Predictor object's 18 efficiency thus summarizes the history of each of the models that were selected as the best model 60 of the predictor object 18.

Figure 22:
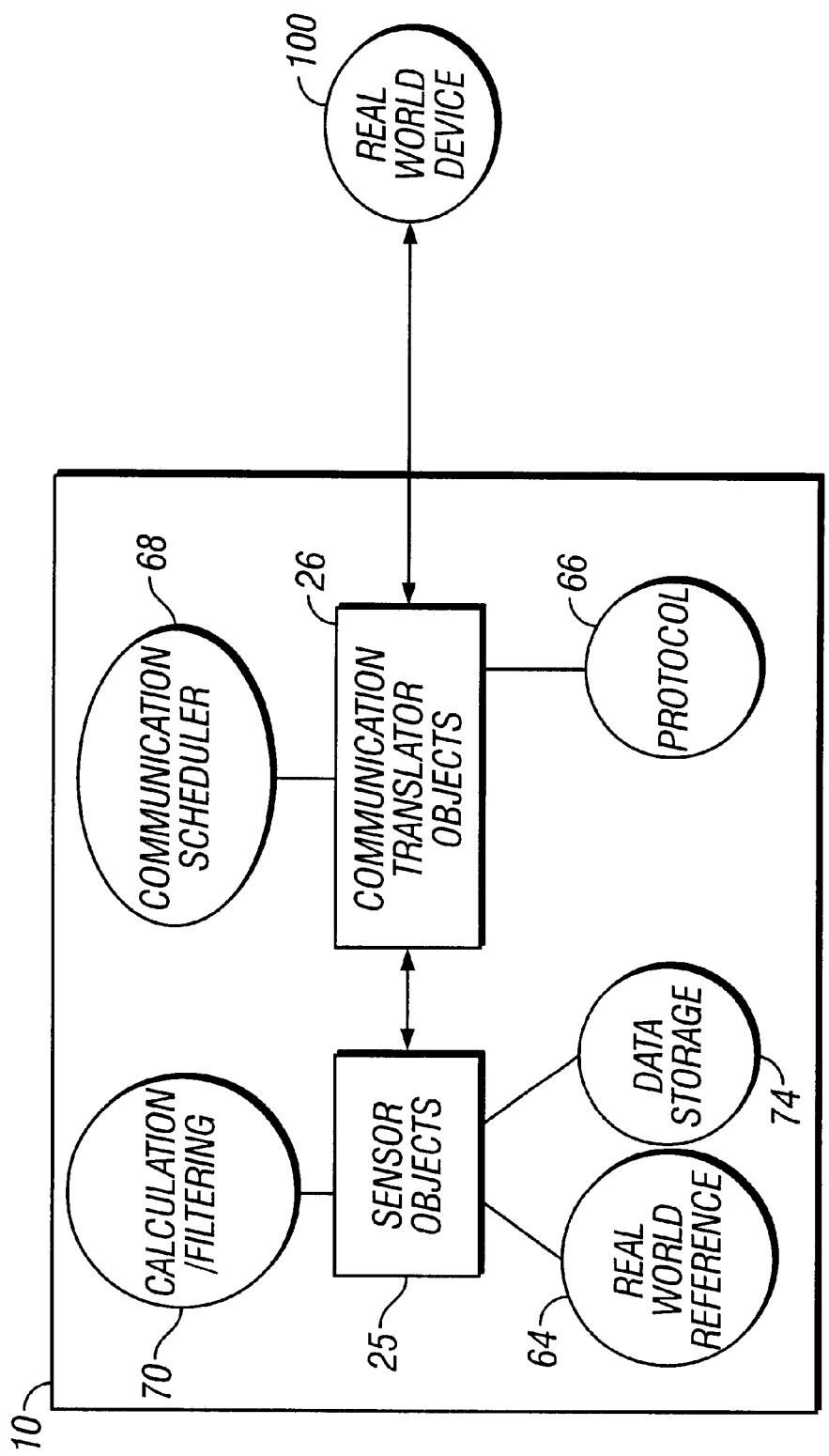
FIG. 22 is a block diagram illustrating how sensor objects and communicator translator objects interact.

FIG. 22 illustrates how sensor objects 25 and communication translator objects 26 interact. Sensor object 25 provides real-world reference 64, i.e. the characteristic data required to identify the data in real-world device 100, to communication translator object 26. Communication translator object 26 stores the reference and schedules requests to retrieve the data from real-world device 100, if necessary; communication translator object 26 creates the request for data from real-world device 100 using a protocol 66 for real-world device 100 known to communicator object 26. At the appropriate sampling delta, communication translator object 26 probes real-world device 100, retrieving the data and passing the data to the sensor object 25. When necessary, sensor object 25 can make asynchronous requests to read or write data on demand. To transmit data to real-world device 100, sensor object 25 passes the data to be communicated to communication translator object 26 using a transmit-data command. Sensor object 25 requests data from real-world device 100 by issuing a request-data command. Whether the data is being requested or transmitted, the sensor object 25 applies the appropriate calculation/filtering 70 methodologies and stores the result in its data storage 74.

The functionality of interconnected ISOs 10 provide control of the real-world entities that they represent, model, optimize and control. The instant invention preferably provides a user with graphical, intuitive user interfaces to initialize and interact with a process control optimization system 1 implemented with the instant invention to achieve ISO 10 interconnection. A specific embodiment of the instant invention provides a unique ability to allow a user to manipulate the graphical interface and graphically represent the process to be controlled by initializing ISOs 10 and groups of ISOs 10 as well as establishing the manner, order, and priority of information flow between ISOs 10. FIG. Nos. 23 through 27 provide examples of how a user relates to the instant invention through the instant invention's graphical user interface.

Figure 23:
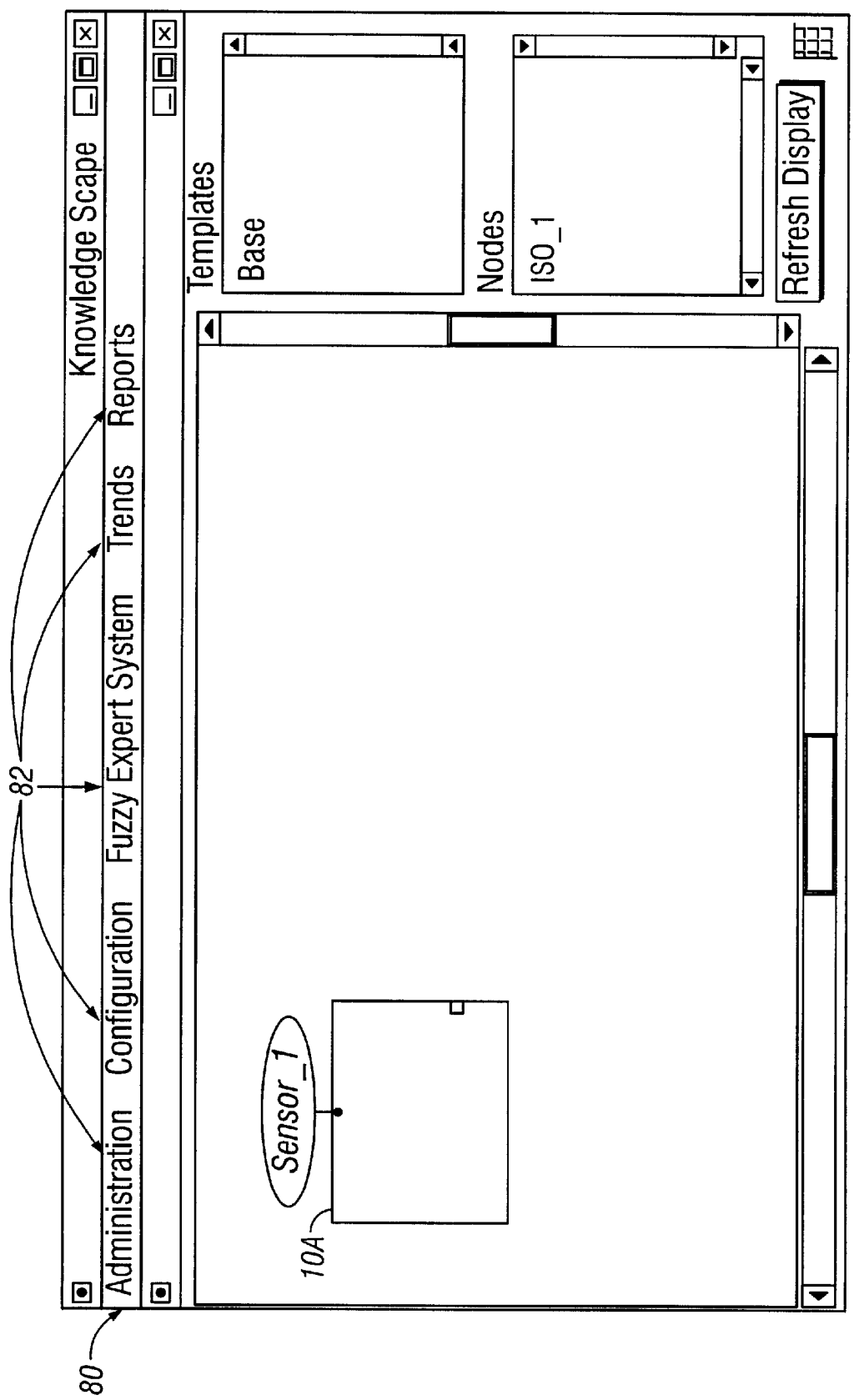
FIG. 23 is a representation of the instant invention's graphical user interface illustrating how a user initializes an ISO.

FIG. 23 illustrates a preferred graphical user interface whereby a user configures and initializes ISOs 10. In general, a user selects one or more menu options 82 from menu 80 to add generic ISOs 10 to a configuration drawing; each ISO 10 can have a unique identifier either supplied by the adaptive, process control optimization system 1 or by the user. Using menu options 82 from menu 80, a user then can edit the configuration of ISO 10A, including the configuration of that ISO's 10A sensor objects 25, expert system objects 12 rules knowledge bases 13, predictor objects 18, adaptive models objects 20, and optimizer objects 22.

Figure 24:
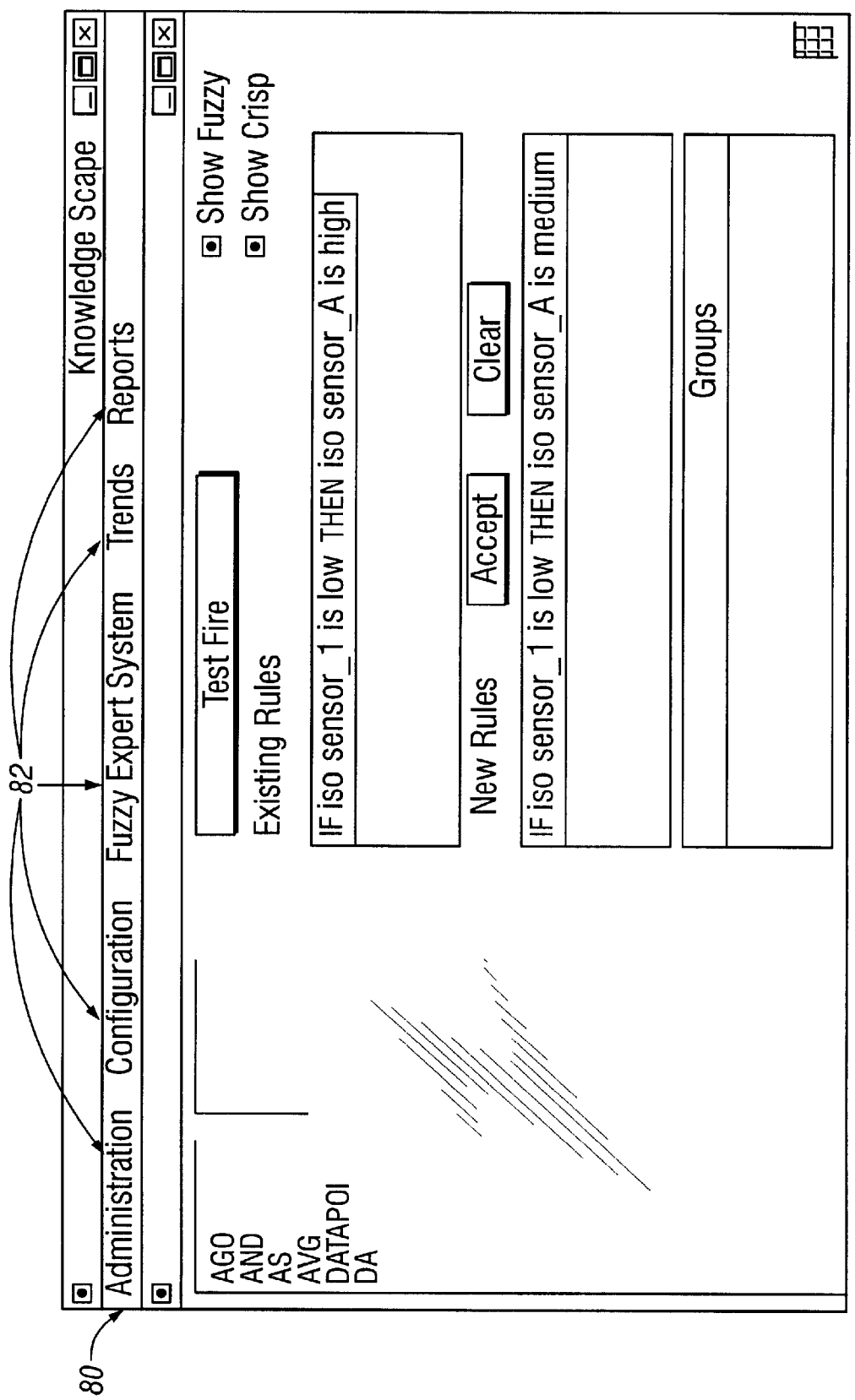
FIG. 24 is a representation of the instant invention's graphical user interface illustrating how a user associates a sensor object with a real-world device.

Although users can configure an ISO 10 when configuring an initial system, FIG. 24 illustrates an example of how a user can use a preferred embodiment's graphical user interface to change ISO's 10 behavior in real-time. In FIG. 24, the graphical user interface is used to select a previously initialized and configured identifiable ISO 10, and further configure a rules knowledge base 13 for an expert system object 12. FIG. 24 illustrates a fuzzy rule 16 previously configured for ISO 10 being changed from:

"IF ISO sensor-1 IS low THEN ISO sensor-A IS high" to:

"IF ISO sensor-1 IS low THEN ISO sensor-A IS medium"

In similar fashion, a user can use the interface shown in FIG. 24 to change the configuration and behavior of sensor objects 25, predictor objects 18, adaptive models objects 20, and optimizer objects 22.

Once a user has configured two or more ISOs 10, users can configure flow and/or hierarchical relationships between ISOs 10. FIG. 25 illustrates a preferred graphical user interface as used to associate an ISO 10 by flow connection 84 to another ISO 10. After creating two ISOs 10, ISO 10A and ISO 10B, via the graphical user interface as illustrated in FIG. 23, a user selects menu option 82 from menu 80 that allows a user to draw and configure a flow connection 84 from ISO 10A to ISO 10B. The user then positions a cursor above ISO 10A using a pointing device such as a mouse, and uses the pointing device's selection method to select ISO 10A, e.g. clicks a mouse button. While continuing to select ISO 10A, the user uses the pointing device to position the cursor above ISO 10B and then releases the pointing device's selection method, causing line 84 ending in an arrow point to be added to the drawing depicting the flow relationship. The arrow point indicates the direction of flow, e.g. from ISO 10A to ISO 10B.

Figure 26:
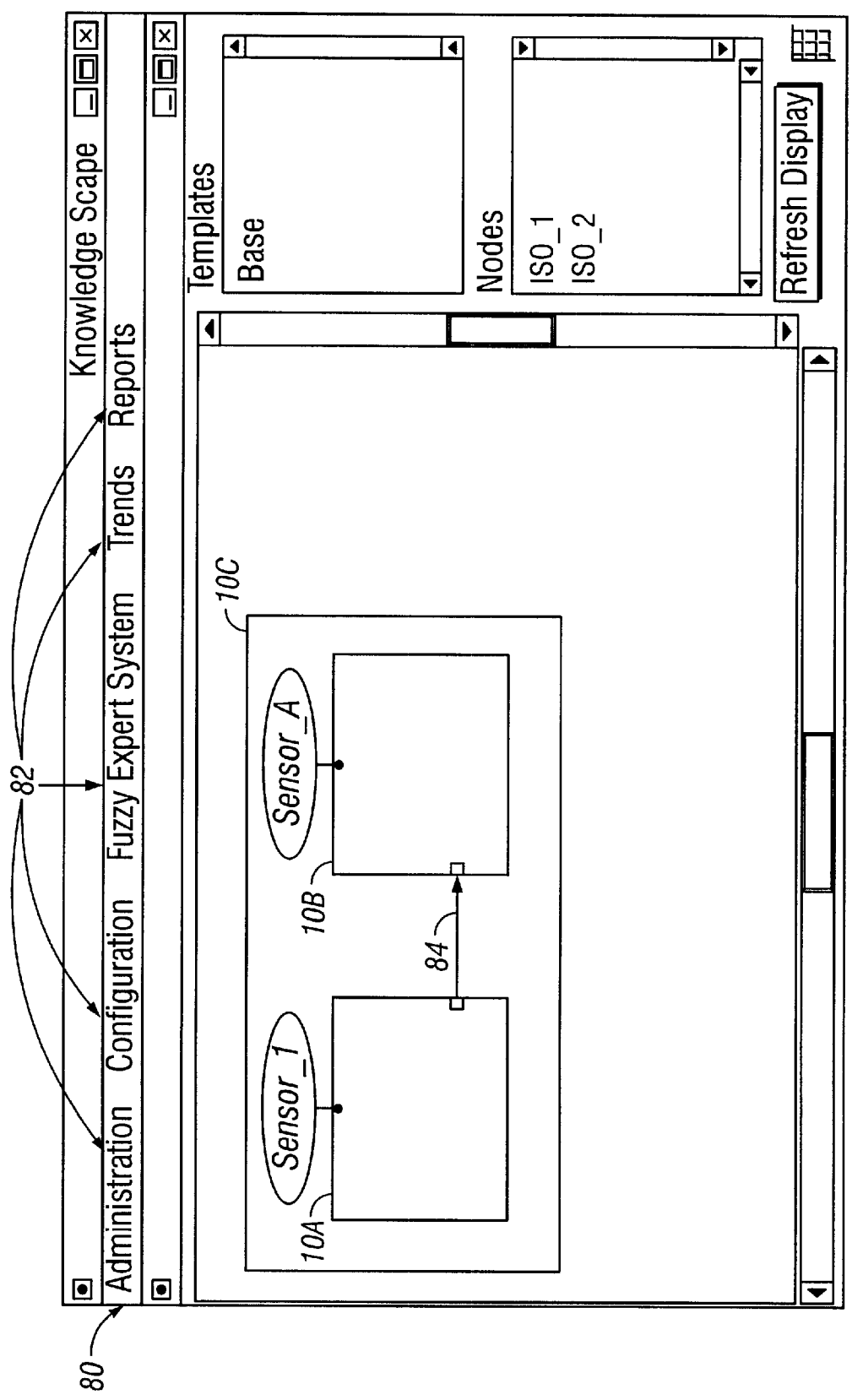
FIG. 26 is a representation of the instant invention's graphical user interface illustrating how a user hierarchically initializes a first ISO and second ISO to a third ISO.

FIG. 26 illustrates the user interface used to relate hierarchically ISO 10A with ISO 10B and with ISO 10C. In this example, a user first creates and configures ISO 10A and ISO 10B as discussed in FIG. 23. In this example, ISO 10A and ISO 10B are further related to each other via a flow connection 84 as described in FIG. 25. The user then selects ISO 10A and ISO 10B by using a pointing device such as a mouse to place a cursor over ISO 10A, selecting ISO 10A with the pointing device's selection ability, e.g. a mouse button, and repeating the selection process for ISO 10B. The user then selects a menu option 82 from menu 80 to create and display ISO 10C; ISO 10C will be one level higher in the hierarchy. ISO 10C will be related to both ISO 10A and ISO 10B by logically encapsulating them as the next highest level in their hierarchy.

Figure 27:
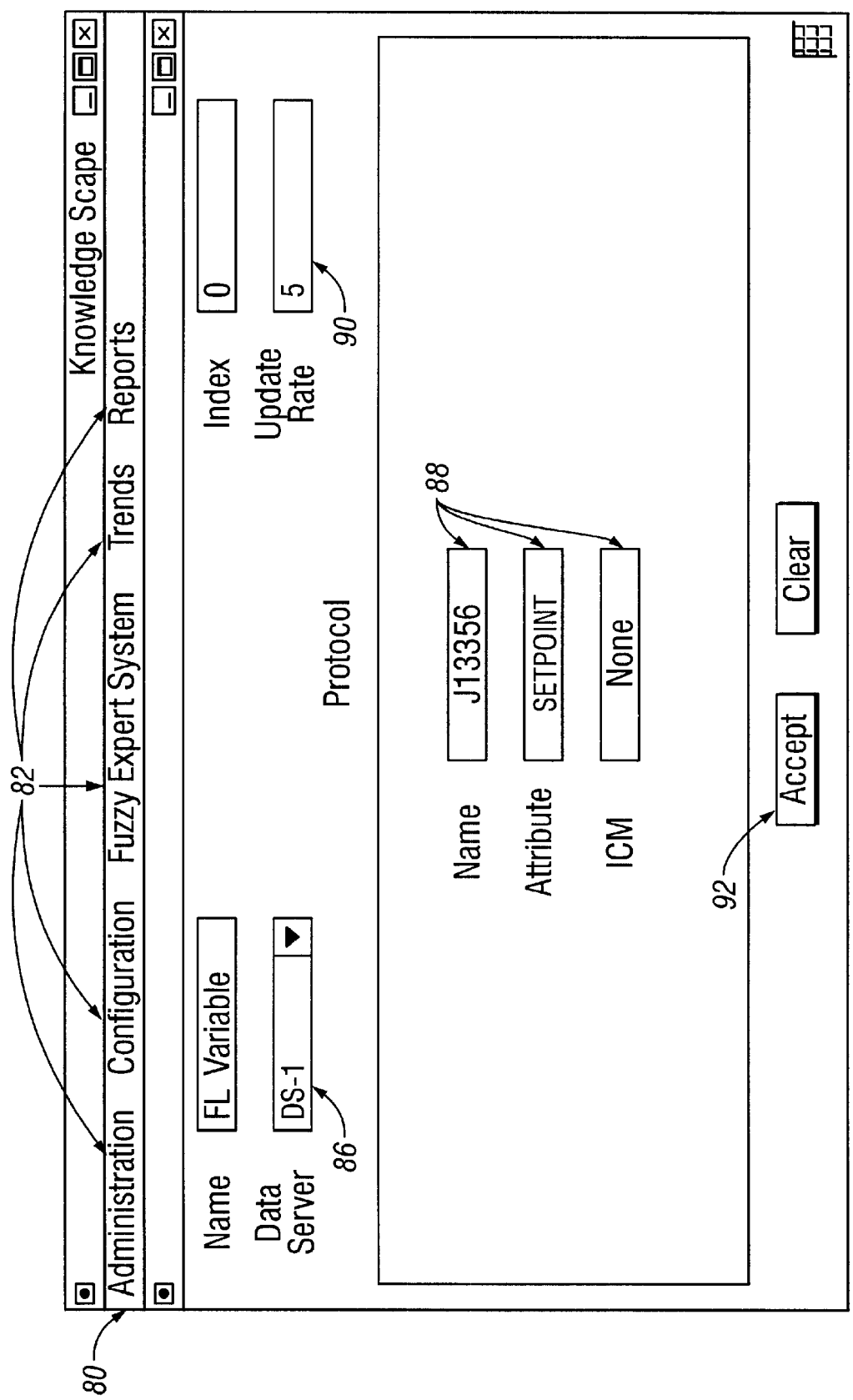
FIG. 27 is a representation of the instant invention's graphical user interface illustrating how a user interfaces with an ISO to change the ISO's behavior in real time.

After ISOs 10 are configured, a user can add sensor objects 25 to ISO 10, optionally relating sensor objects 25 to real-world devices 100. FIG. 27 illustrates a preferred graphical user interface being used to associate ISO's 10 sensor object 25 with a real-world device 100. In this example, a user selects a real-world device 100 in the pull-down combo box labeled "Data Server" 86. Based on the pre-configured protocol(s) for that device, configuration fields 88 appear in the lower section of the display. For the protocol so selected, the user specifies certain attributes of real-world device 100 in configuration fields 88, such as those shown in FIG. 27: "NAME," "ATTRIBUTE" AND "ICM". An update rate for scheduling automatic data retrieval is configured in the type-in box labeled "Update Rate" 90. When the user has properly configured these options, he selects "Accept" button 92.

While preferred embodiments have been shown and described, various modifications and substitutions may be made thereto without departing from the spirit and scope of the invention. Accordingly, it is intended that all variations within the scope and spirit of the appended claims be embraced by the foregoing disclosure.

What is claimed is:

1. A method for adaptively controlling the rate of addition of a chemical to a process comprising:
    conducting a process which is controlled by a distributed control system;
    utilizing an adaptive process control optimization system in a host relationship to the distributed control system wherein the process control optimization system provides (i) a plurality of goal seeking intelligent software objects further comprising sensor software objects providing current data, historical data, and statistical data; (ii) expert system software objects providing at least one associated rules knowledge base; (iii) adaptive models software objects providing at least one modeling methodology; (iv) predictor software objects providing at least one predictor selection criteria; (v) optimizer software objects providing at least one goal and providing at least one process constraint; and (vi) communications translator software objects providing one or more data communications protocols for a given sampling delta, comprising the concurrent steps of:
    determining, within the optimizer software objects, output data values which achieve the goals without violating the process constraints;
    examining, within the expert system software objects, the predictive models that achieve the goals without violating the process constraints, wherein the adaptive process control optimization system changes its models to adapt to current process conditions;
    determining, within the expert system software objects, at least one adaptive intervention;
    providing the at least one adaptive intervention as an input to a distributed control system; and
    utilizing the at least one adaptive intervention input to the distributed control system for controlling the process.

2. The method of claim 1, further comprising a step utilizing an on-line sensor to provide key performance indicator measurements as input to at least one communications translator software object, wherein the expert system provides data validation.

3. The method of claim 1, wherein at least one expert system software object provides an associated rules knowledge base for validation of the current data, wherein the expert system validates control commands.

4. The method of claim 1, wherein at least one adaptive model software object provides one or more modeling methodologies for calculating a key performance indicator based upon the current data, historical data, and statistical data, wherein the adaptive process control optimization system monitors its own performance and modifies its own initial configuration to improve performance according to its initial optimizing goals.

5. The method of claim 4, wherein the key performance indicator indicates residual chemical levels in a process fluid; conditions conducive to salt removal from hydrocarbons; conditions conducive to promotion of chemical reactions; conditions conducive to treatment of waste water, conditions conducive to treatment of finished fuels, indicates product stability; fouling conditions, corrosive conditions, foaming conditions, azeotropic conditions, emulsifying conditions, conditions conducive to byproduct formation, metal passivation and biological growth produced by the process.

6. The method of claim 1, wherein at least one of the optimizer software object provides a desired chemical addition rate to the process, wherein the adaptive model changes over time and adapts to a designated task.

7. The method of claim 6, wherein at least one of the optimizer software object provides a desired scavenger chemical addition rate to the process.

8. The method of claim 6, wherein at least one of the optimizer software object provides a desired flocculant chemical addition rate to the process.

9. The method of claim 6, wherein at least one of the data communications protocols enables the process control optimization system to output a value to the distributed control system representing the desired chemical addition rate to the process.

10. The method of claim 9, further comprising the steps of utilizing at least one expert system software object to provide an associated rules knowledge base to make a decision to authenticate the desired chemical addition rate to the process and output the value to the distributed control system or to reject the desired chemical rate provided by at least one of the optimizer software objects and to provide a newly calculated desired chemical addition rate.

11. The method of claim 1, further comprising:
    alerting a user when a process condition has an integrated effect over time.

12. The method of claim 1, further comprising:
    adjusting chemical addition rates at a global optimum.

13. The method of claim 1, wherein the adaptive model is a neural network.

14. The method of claim 1, further comprising:
    Using adaptive models produce a variety of competing adaptive models from which a predictor object selects the best fit to actual data for a given sampling delta.

15. The method of claim 1, wherein the predictor objects and adaptive models learn how to model the processes they represent.

16. The method of claim 1, wherein the ISOs provide trained models to other ISOs.

17. The method of claim 1, wherein a large offset causes an optimizer object to procreate a new model for a new operating mode.

18. The method of claim 1, further comprising:
    making optimizing control actions in a manner consistent with management objectives and goals.

19. A method for adaptively controlling the rate of addition of a chemical to a process comprising:
    conducting a process which is controlled by a distributed control system;
    utilizing an adaptive process control optimization system in a host relationship to the distributed control system wherein the process control optimization system provides (i) a plurality of goal seeking intelligent software objects further comprising sensor software objects providing current data, historical data, and statistical data; (ii) expert system software objects providing at least one associated rules knowledge base; (iii) adaptive models software objects providing at least one modeling methodology; (iv) predictor software objects providing at least one predictor selection criteria; (v) optimizer software objects providing at least one goal and providing at least one process constraint; and (vi) communications translator software objects providing one or more data communications protocols for a given sampling delta, comprising the concurrent steps of:
        determining, within the optimizer software objects, output data values which achieve the goals without violating the process constraints;
        examining, within the expert system software objects, the predictive models that achieve the goals without violating the process constraints, wherein the adaptive process control optimization system changes its models to adapt to current process conditions, wherein at least one adaptive model software object provides one or more modeling methodologies for calculating a key performance indicator based upon the current data, historical data, and statistical data, wherein the adaptive process control optimization system monitors its own performance and modifies its own initial configuration to improve performance according to its initial optimizing goals, wherein the key performance indicator indicates residual chemical levels in a process fluid, conditions conducive to salt removal from hydrocarbons; conditions conducive to promotion of chemical reactions, conditions conducive to treatment of waste water, conditions conducive to treatment of finished fuels, indicates product stability; fouling conditions, corrosive conditions, foaming conditions, azeotropic conditions, emulsifying conditions, conditions conducive to byproduct formation, metal passivation and biological growth produced by the process, wherein at least one of the optimizer software object provides a desired chemical addition rate to the process, wherein the adaptive model changes over time and adapt to designed task;
        determining, within the expert system software objects, at least one adaptive intervention;
        providing the at least one adaptive intervention as an input to a distributed control system;
        utilizing the at least one adaptive intervention input to the distributed control system for controlling the process;
        utilizing an on-line sensor to provide key performance indicator measurements as input to at least one communications translator software object, wherein the expert system provides data validation, wherein at least one expert system software object provides an associated rules knowledge base for validation of the current data, wherein the expert system validates control commands.

20. A method for adaptively controlling the rate of addition of a chemical to a process comprising:
    conducting a process which is controlled by a distributed control system;
    utilizing an adaptive process control optimization system in a host relationship to the distributed control system wherein the process control optimization system provides (i) a plurality of goal seeking intelligent software objects further comprising sensor software objects providing current data, historical data, and statistical data; (ii) expert system software objects providing at least one associated rules knowledge base; (iii) adaptive models software objects providing at least one modeling methodology; (iv) predictor software objects providing at least one predictor selection criteria; (v) optimizer software objects providing at least one goal and providing at least one process constraint; and (vi) communications translator software objects providing one or more data communications protocols for a given sampling delta, comprising the concurrent steps of:
        determining, within the optimizer software objects, output data values which achieve the goals without violating the process constraints;
        examining, within the expert system software objects, the predictive models that achieve the goals without violating the process constraints, wherein the adaptive process control optimization system changes its models to adapt to current process conditions;
        determining, within the expert system software objects, at least one adaptive intervention;
        providing the at least one adaptive intervention as an input to a distributed control system;
        utilizing the at least one adaptive intervention input to the distributed control system for controlling the process;

alerting a user when a process condition has an integrated effect over time;

adjusting chemical addition rates at a global optimum;

Using adaptive models produce a variety of competing adaptive models from which a predictor object selects the best fit to actual data for a given sampling delta;

wherein the predictor objects and adaptive models learn how to model the processes they represent;

wherein the ISOs provide trained models to other ISOs, wherein a large offset causes an optimizer object to procreate a new model for a new operating mode; and making optimizing control actions in a manner consistent with management objectives and goals.

* * * * *